(12) United States Patent
Asamarai et al.

(10) Patent No.: US 7,690,611 B2
(45) Date of Patent: Apr. 6, 2010

(54) DISPLAY MOUNTING SYSTEM AND METHOD

(75) Inventors: Saeb Asamarai, Columbia Heights, MN (US); Robert W. Fluhrer, Prior Lake, MN (US); Shaun C. Lindblad, Lino Lakes, MN (US); Khalid Alzebdeh, Apple Valley, MN (US)

(73) Assignee: Ergotron, Inc., St. Paul, MN (US)

( * ) Notice: Subject to any disclaimer, the term of this patent is extended or adjusted under 35 U.S.C. 154(b) by 622 days.

(21) Appl. No.: 11/254,225

(22) Filed: Oct. 19, 2005

(65) Prior Publication Data

US 2006/0226326 A1 Oct. 12, 2006

Related U.S. Application Data

(60) Provisional application No. 60/620,084, filed on Oct. 19, 2004.

(51) Int. Cl.
*E04G 3/00* (2006.01)
(52) U.S. Cl. .............. 248/284.1; 248/917; 248/919; 248/921; 248/225.11
(58) Field of Classification Search .......... 248/284.1, 248/274, 1, 917, 919, 921, 922, 923, 225.11, 248/225.21; 361/681, 679.22, 679.21
See application file for complete search history.

(56) References Cited

U.S. PATENT DOCUMENTS

| 4,408,835 | A | 10/1983 | Deprez et al. |
|---|---|---|---|
| 5,537,290 | A | 7/1996 | Brown et al. |
| 6,102,348 | A | 8/2000 | O'Neill |
| 6,402,109 | B1 | 6/2002 | Dittmer |
| 6,559,829 | B1 | 5/2003 | Matsuo et al. |
| 6,604,722 | B1 * | 8/2003 | Tan ................ 248/276.1 |
| 7,175,146 | B2 * | 2/2007 | Kim ................ 248/279.1 |
| 2002/0033436 | A1 | 3/2002 | Peng et al. |
| 2002/0179784 | A1 | 12/2002 | Mehta |
| 2002/0179791 | A1 | 12/2002 | Kwon |
| 2003/0001053 | A1 | 1/2003 | Cho et al. |
| 2003/0201372 | A1 | 10/2003 | Dozier |
| 2003/0222041 | A1 | 12/2003 | Hong et al. |

FOREIGN PATENT DOCUMENTS

EP 11094192 4/1999
WO WO 2004/063619 A2 7/2004

\* cited by examiner

*Primary Examiner*—Anita M King
(74) *Attorney, Agent, or Firm*—Fredrikson & Byron, P.A.

(57) ABSTRACT

A mounting system includes a first surface and a second surface. A device panel can include at least first and second engaging members. The first and second surfaces are sized and shaped to engage the first and second engaging members respectively, and the first and second engaging members move along the first and second surfaces. The first and second surfaces are sized and shaped so the reaction forces between the first and second engaging members and the mounting panel cooperate to counteract the moment created by the center of gravity of the device panel to continuously immobilize the device panel at the plurality of angles relative to the support surface.

27 Claims, 25 Drawing Sheets

Fig. 6

602 — SELECTIVELY POSITION DEVICE PANEL RELATIVE TO MOUNTING PANEL, WHEREIN FIRST AND SECOND ENGAGING MEMBERS ARE MOVEABLY COUPLED BETWEEN DEVICE PANEL AND MOUNTING PANEL, AND FIRST AND SECOND ENGAGING MEMBERS ARE RECEIVED WITHIN FIRST AND SECOND SUBSTANTIALLY CONTINUOUS SLOTS OF MOUNTING PANEL, RESPECTIVELY.

604 — CONTINUOUSLY IMMOBILIZE DEVICE PANEL RELATIVE TO MOUNTING PANEL, WHEREIN FIRST AND SECOND ENGAGING MEMBERS ENGAGE AGAINST MOUNTING PANEL, AND FIRST AND SECOND SLOTS ARE SIZED AND SHAPED SO REACTION FORCES BETWEEN FIRST AND SECOND ENGAGING MEMBERS AND MOUNTING PANEL COOPERATE TO CONTINUOUSLY COUNTERACT WEIGHT OF AT LEAST THE DEVICE PANEL.

600

DISPLAY MOUNTING SYSTEM AND METHOD

RELATED APPLICATIONS

This application claims priority to U.S. Provisional Patent Application Ser. No. 60/620,084, filed Oct. 19, 2004, and titled "Slotted Display Screen Mount and Method," the contents of which are hereby incorporated by reference.

TECHNICAL FIELD

The invention relates to devices and methods for moveably supporting equipment including, but not limited to, flat panel display screens such as plasma screens, liquid crystal display screens, etc.

BACKGROUND

Display screens, such as flat panel displays, are commonly mounted on surfaces such as walls, ceilings, inclined surfaces, poles and/or carts. Typically, these displays are mounted on such surfaces with a fixed mount that does not provide for adjustment of the position of the display. In mounts that have provided for the adjustment of the position of the display, the mounts tend to have many moving parts, such as springs and locking systems. In addition, such mounts tend to be specifically adapted for a specific display. That is, they are not able to mount a variety of displays having different sizes and weights.

SUMMARY OF THE INVENTION

Embodiments of the invention include mounts for mounting displays to a surface. Such mounts provide for the tilting of the display relative to the surface in a smooth manner with a minimum of moving parts. In some embodiments, the mount includes at least one surface sized and shaped to create cooperate reaction forces to counteract the moment created by the changing center of gravity location of the device panel to continuously immobilize the device panel within the range of angles allowed by the mount. Such a mount allows a user to easily adjust the tilt of even relatively large displays without locks, levers, or pins.

In some embodiments, the invention includes a first surface and a second surface. The first and/or second surface can be a camming surface. Generally, a camming surface may be defined as a surface adapted to provide appropriate reactionary forces to desirably balance a system. In some embodiments, the first and/or second surface may be provided within one or more slots. Further, a first engaging member and a second engaging member may be provided. The first surface may be adapted to contact the first engaging member, and the first engaging member can be sized and shaped to smoothly move along the first surface, and the second surface can be adapted to receive the second engaging member, and the second engaging member can be sized and shaped to smoothly move along the second surface. The first and second surfaces and the first and second engaging members may be independently carried by the display or the mount. In some embodiments, the first and second surfaces are sized and shaped so the first and second engaging members and the mounting panel engage to create cooperate reaction forces to counteract the weight of at least the device panel and continuously immobilize the device panel at a plurality of angles relative to the mounting panel.

BRIEF DESCRIPTION OF THE DRAWINGS

FIG. 6 shows a block diagram of one example of a method for using a mounting system in accordance with an embodiment of the invention.

DESCRIPTION OF THE EMBODIMENTS

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural changes may be made without departing from the scope of the present invention. Therefore, the following detailed description is not to be taken in a limiting sense, and the scope of the present invention is defined by the appended claims and their equivalents.

Figure 1:
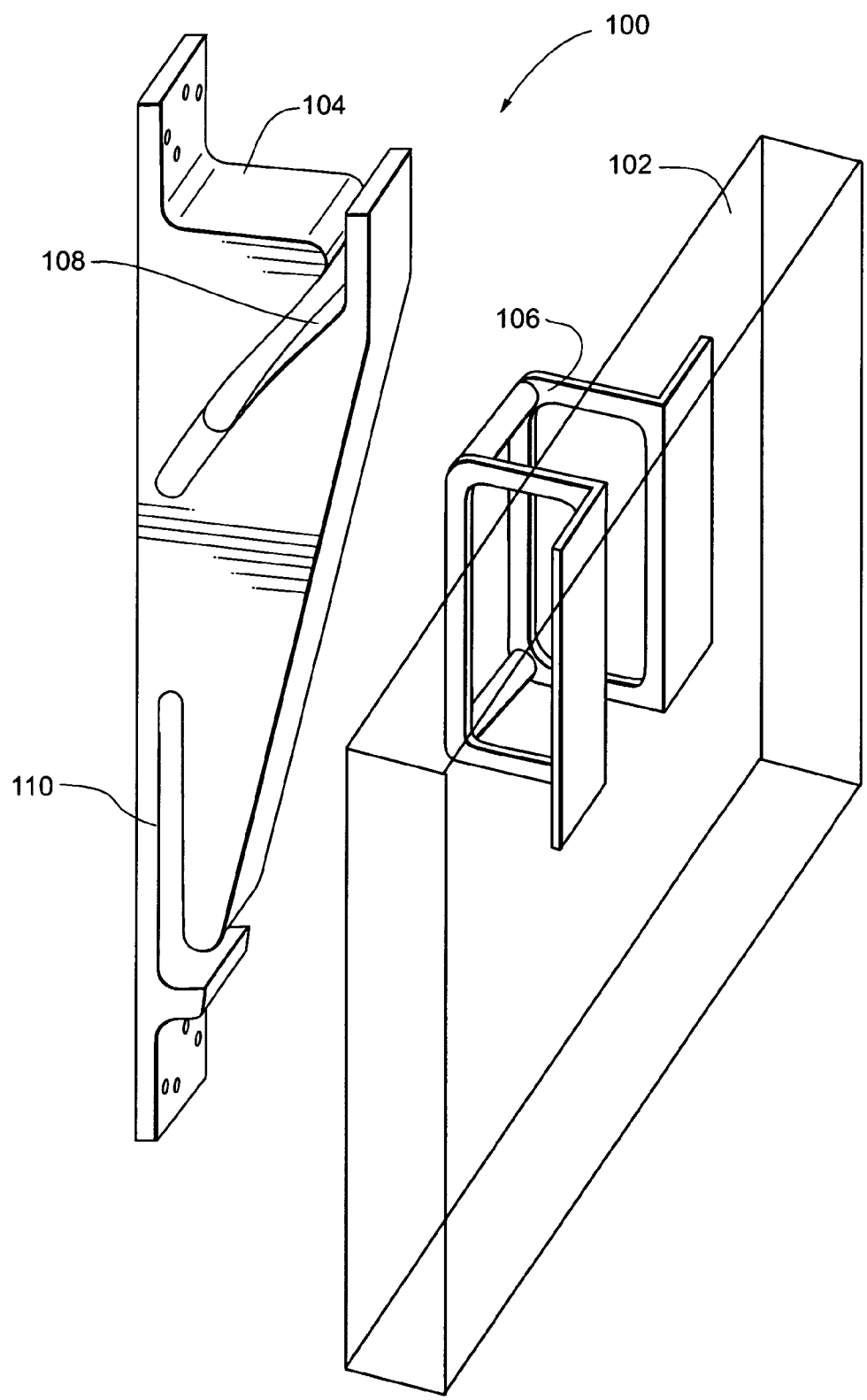
FIG. 1 shows an exploded perspective view of one example of a display screen mounting system in accordance with an embodiment of the invention.

FIG. 1 shows an exploded perspective view of one example of a mounting system 100. The mounting system 100 operates to moveably couple an object, such as a display screen 102 to a surface (i.e., a wall, ceiling, columnar member or the like). The display screen 102 includes, but is not limited to, a plasma television, LCD screen, LCD projection display, or the like. The mounting system 100 may accommodate a wide variety of display sizes and weights. For example, the mounting system 100 may accommodate displays ranging from about 10 inches to about 70 inches and/or from about 5 pounds to about 200 pounds (e.g., about 175 pounds). In some embodiments, the mounting system 100 may comprise a mount 104 and a device panel 106. Further, the mounting system may be used to accommodate a wide variety of initial display center of gravity locations, which may be defined as the distance of the center of gravity location from a support surface. In some embodiments, the mounting system 100 may accommodate an initial center of gravity location of about 1 inch to about 10 inches. In other embodiments, the mounting system 100 may accommodate an initial center of gravity location of about 2 inches to about 8 inches. In yet still other embodiments, the mounting system 100 may accommodate an initial center of gravity location of about 3 inches to about 6 inches.

In some embodiments, the mount 104 includes a first surface 108 and a second surface 110. The surfaces 108, 110 cooperate to allow the display position (e.g., tilt) to be easily adjusted, but to continuously immobilize the display when adjustment is not desired. Continuous immobilization allows for the display to be positioned and secured at any angle within the range of angles allowed by the mount. Generally, the surfaces 108, 110 cooperate to balance the changing moments created by the changing center of gravity position of the display as it is moved. For example, the shape of the first and second surfaces may cooperate so that the sum of the moments about the mount remain zero, regardless of the position of the display within the range of angles allowed by the mount. As described further below, the first and second surfaces 108, 110 may be provided in any suitable form or configuration to provide this result. For example, one or more of the surfaces can be provided within a slot, as shown in FIG. 1. Further, one or more of the surfaces may be an existing structure, such as a wall or floor. In addition, one or more of the surfaces may be carried by the display itself.

The configuration of the first and second surfaces 108, 110 will depend on the application (e.g., space constraints, distance range of the display center of gravity relative to the mount, size of panel, and extent of range desired), the shape of the other surface, and the distance between the two surfaces. These factors work together to determine the optimum first and second surface configuration.

Further, the mounting systems 100 in accordance with some embodiments of the invention may be adapted to provide for constant force adjustment of a display. In such embodiments, a generally equal force may be applied to move the display between any two equivalent distances within the range of motion allowed by the mount. In other embodiments, the system 100 may be adapted to require varying levels of force to adjust the display. For example, the system may be adapted to require progressively more force as the display is titled by changing the materials or shape of the system.

For purposes of discussion, a representative embodiment of a mounting system 100 of the invention will be described with respect to FIGS. 1-6. Examples of additional embodiments of mounting systems 100 and various components of such systems will then be described. As shown in the embodiment of FIG. 1, the mounting system 100 includes a mount 104 and a device panel 106 moveably coupled to the mounting panel 104. The display screen 102 is coupled to the device panel 106, in one example with bolts or the like extending through the device panel 106 and coupled with the display screen 102. In another example, the display screen 102 is secured to the device panel 106 with bosses extending from the display screen 102 and secured within corresponding recesses in the device panel 106. Optionally, bosses extend from the device panel 106 and are secured within recesses in the display screen 102. The device panel 106 is coupled to the display screen 102, in another option, with an adhesive or the like. The device panel 106, in yet another example, includes the display screen 102 so the display screen 102 is moveably coupled to the mount 104.

Figure 2:
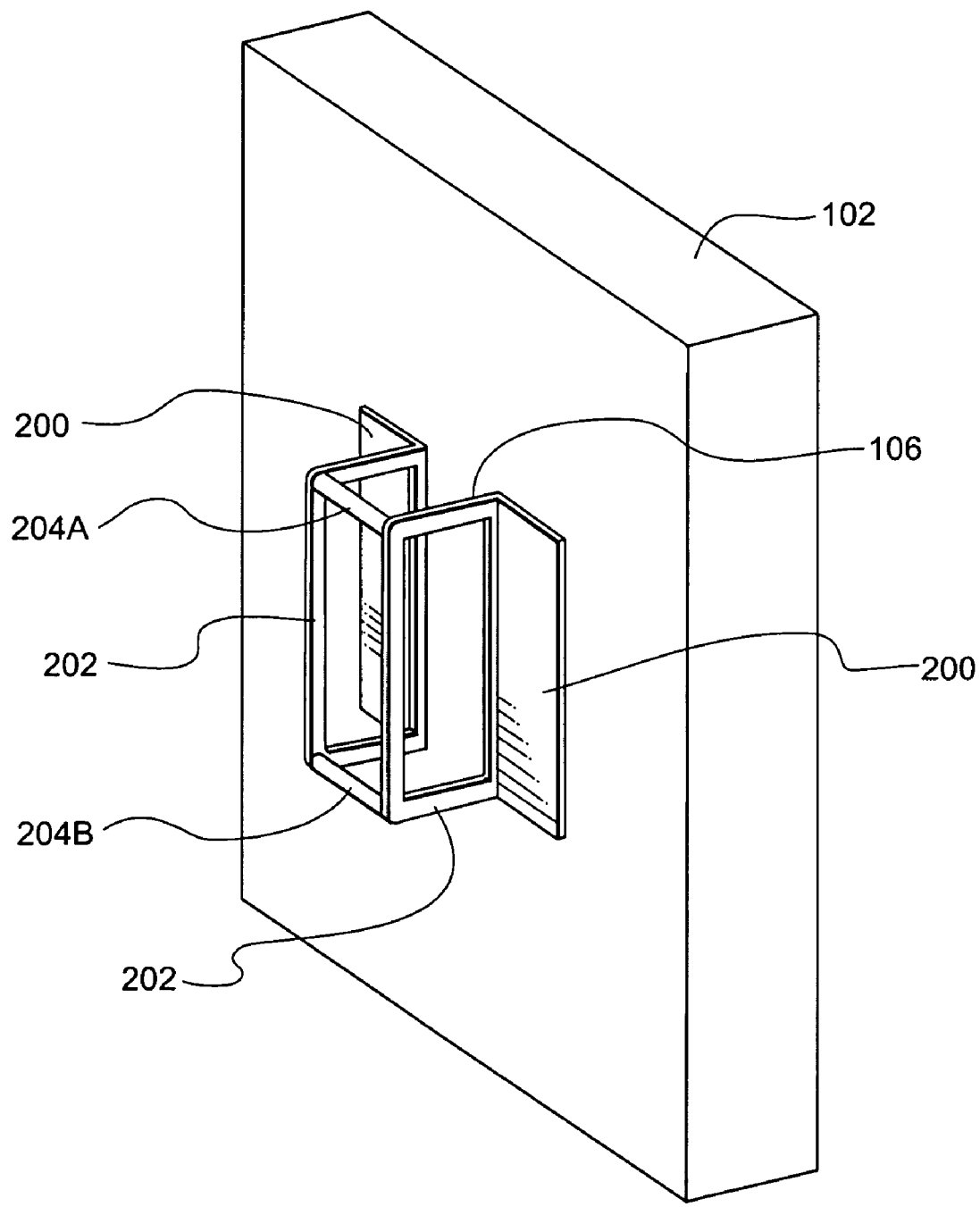
FIG. 2 shows a perspective view of one example of a device panel coupled to a display screen in accordance with an embodiment of the invention.

FIG. 2 is a perspective view of the display screen 102 coupled to the device panel 106. The device panel 106, in one example, includes coupling plates 200. The coupling plates 200 engage against the display screen 102 to couple the device panel 106 to the display screen 102. The coupling plates 200 couple with the device panel 106 as described above (i.e. with bolts, bosses, adhesives or the like). The coupling plates 200 are coupled with the display screen 102 to position the device panel 106 along the rear surface of the display screen 102 and to facilitate coupling between the display screen 102 and the mount 104 (FIG. 1). In another example, the device panel 106 and the display screen 102 are integral.

Panel brackets 202 extend from the coupling plates 200 away from the display screen 102. In the example shown in FIG. 2, the panel brackets 202 are in the shape of a parallelogram, for instance a rectangle. In another example, the panel brackets 202 have square, rhomboid, and/or ovular geometries or the like. Each panel bracket 202 is substantially parallel with the other panel bracket 202. The panel brackets 202, in one example, are formed with the coupling plates 200, for instance by die punching sheet metal and bending the panel brackets 202 at an angle relative to the coupling plates 200. In another example, the panel brackets 202 are formed separately from the coupling plates 200 and coupled thereto with adhesives, bolts, screws, welding or the like. The panel brackets 202 are constructed with materials having sufficient strength to support the display screen 102 for extended periods of time. For example, the panel brackets 202 include, but are not limited to, steel, polymers, composites or the like.

Engaging members 204A, B extend between the panel brackets 202. The panel brackets 202 space the engaging members 204A, B from the display screen 102 to facilitate movement of the display screen 102 with respect to the mounting panel 104 (FIG. 1) as described below. The engaging member 204A is relatively disposed above the engaging member 204B. The engaging members 204A, B include similar materials as the panel brackets 202 (i.e., steel, polymers, composites, or the like). The engaging members 204A, B are coupled between the panel brackets 202 with adhesives, bolts, screws or the like. Optionally, the engaging members 204A, B are integral with the panel brackets 202. The engaging members 204A, B are substantially parallel to each other, in one example. In another example, the engaging members 204A, B have a substantially rounded (e.g. circular) cross-section to facilitate sliding movement within slots in the mounting panel 104 (FIG. 1) as described below.

Figure 12A:
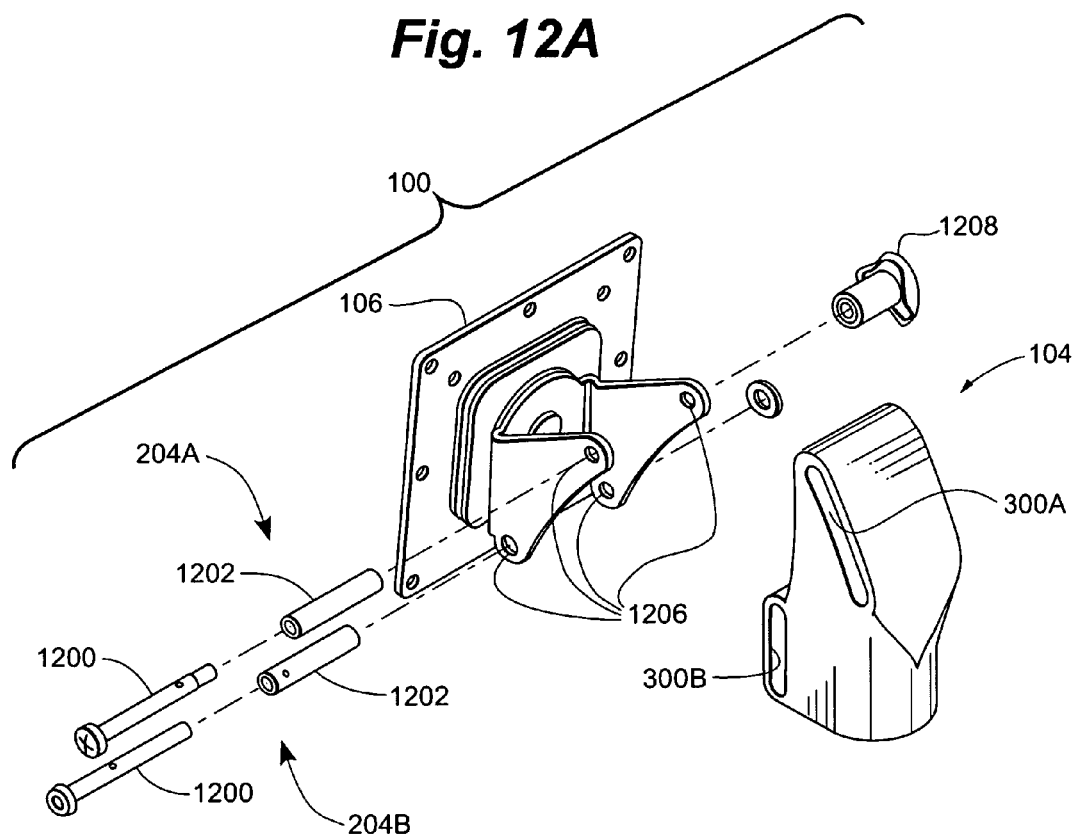
FIG. 12A shows an exploded view of a mounting system in accordance with an embodiment of the invention.

In yet another example, the engaging members 204A, B are at least partially surrounded by rollers (e.g., bearings) to permit rolling communication with the slots, as described further below and shown in FIG. 12A. In one option, the rolling bearings include a collar constructed with, but not limited to, metals or polymers. The outer collar is sized and shaped to contain bearings (e.g., ball bearings, needle bearings or the like). An inner collar is positionable along the engaging members 204A, B, in another option, to allow rolling movement of the bearings between the inner and outer collars. The rolling bearings facilitate movement of particularly heavy display screens coupled to the display panel 106. The display screen remains continuously positionable, and the rolling bearings, in one option allow any user to adjust the orientation of substantially any display screen.

Figure 3:
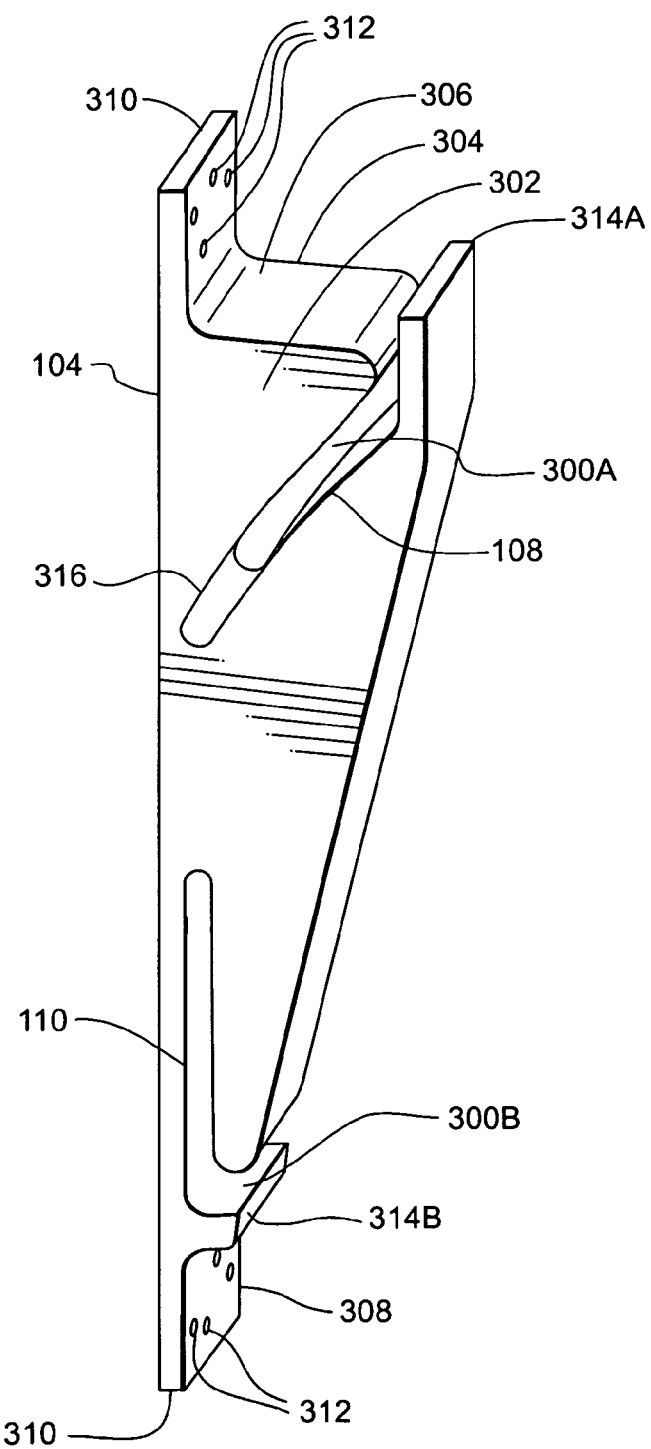
FIG. 3 shows a perspective view of one example of a mount in accordance with an embodiment of the invention.

FIG. 3 is a perspective view of the mounting panel 104 including surfaces 108, 110 included within slots 300A, B. In one example, the mount 104 has a single piece construction with the slots 300A, B formed in the mount 104. In another example, the mount 104 includes two or more portions each of providing at least one slot. For instance, two slots 300A are formed in dual mounting panels positioned adjacent either side of the display screen 102. The slot 300B is formed in a third mounting panel position between the dual mounting panels providing slots 300A. The mounting panels are individually positionable along a surface, such as a wall to provide for a variety of device panels 106 sized and shaped to couple with differing display screens. Optionally, the number of mounting panels and their positions relative to each other are selectable according to the application and desires of the user.

The slots 300A, B extend through at least a portion of the mount 104. As shown in FIG. 3, the slots 300A, B extend between the surfaces 302, 304. The slot 300A, in one example, extends from an upper portion 306 toward a lower portion 308 of the mounting panel 104. The slot 300B, in another example, extends from the lower portion 308 toward the upper portion 306. In yet another example, the slots 300A, B of the mounting panel 104 communicate with each other to form a consolidated slot.

The slots 300A, B, in one example, include substantially uninterrupted portions (i.e. the slots substantially lack features such as jags, recesses, flanges or the like) to facilitate smooth movement of the engaging members 204A, B (FIG. 2) within the slots 300A, B, as described below. Optionally, the mounting panel 104 includes a feature such as a detent or the like along the slots 300A, B to assist in retaining the engaging members 204A, B in desired positions along the slots 300A, B. In another example, the slots 300A, B follow substantially continuous paths to allow continuous positioning of the device panel 106 and display screen 102 (FIG. 1) relative to the mounting panel 104. The substantially uninterrupted slots 300A, B allow selective positioning of the device panel 106 and display screen 102 at a plurality of unprescribed angles relative to the mounting panel 104. An advantage of this design includes the device panel 106 and the display screen 102 not being limited to discrete prescribed positions defined by recesses, notches or the like. The device panel 106 and display screen 102 are positionable with engaging members 204A, B anywhere along the substantially continuous paths of the slots 300A, B. As a result, the device panel 106 and the display screen 102 are continuously positionable in unprescribed orientations with the continuous slots 300A, B.

The slot 300A extending between the upper portion 306 and the lower portion 308, has a curved geometry and is transverse to the slot 300B (i.e., the slot 300A crosses the surface defined by the slot 300B). In another example, the slot 300B and/or the slot 300A have curved geometries and are transverse to each other. The curved geometry of the slot 300A, shown in FIG. 3, follows a predetermined arc that facilitates immobilization of the device panel 106 and the display screen 102 (FIG. 1) when the device panel is moveably coupled to the mount 104. The predetermined arc of the slot 300A allows the reaction forces generated between the engaging members 204A, B (FIG. 2) and the mount 104 to cooperatively counteract the weight of the display screen 102 and/or the device panel 106 in multiple positions along a range of motion. In another example, continuous immobilization of the display screen 102 and/or the device panel 106 relative to the mount 104 is achieved as the vectors of the reaction forces between the engaging members 204A, B and the mount 104 are controlled by the geometry of the slots 300A, B. In the example shown in FIG. 1, the geometries of the slots 300A, B provide continuous immobilization of the device panel 106 and the display screen 102 through the engaging members 204A, B (FIG. 2) smoothly moved along the slots 300A, B. In the example described above, where slots 300A, B have curved geometries, the mount 104 presents a more slender profile against a surface (e.g., a wall), while providing a large range of travel for the display panel 106 and/or the display screen 102. As a result the mounting device 100 narrowly extends from the surface where the display panel 106 is in any orientation.

In some embodiments, the mount will hold the panel away from a support surface (e.g., a wall) about 3.5 inches when the panel is in a vertical orientation. However, this distance will depend on the application. For example, larger displays generally are spaced a farther distance from the support surface than smaller displays to provide the same amount of adjustment range because the edges of larger display may contact the support surface during adjustment unless the are spaced a suitable distance from the support surface.

The mounting panel can be attached to a surface in any suitable manner. In some embodiments, the mount 104 further includes flanges 310. The flanges 310 include fastening fixtures to couple the mounting panel 104 to a surface (e.g., a wall, ceiling, columnar member, or the like). In one example, the fastening fixtures include openings 312 in the flanges 310 sized and shaped to receive bolts, screws, nails or the like. In another example, the fastening fixtures on the flanges 310 include bosses sized and shaped to be received in corresponding recesses in a surface, such as a wall. Optionally the flanges 310 include recesses sized and shaped to receive bosses extending from the flange 310 surface (e.g., a wall). In another option, the mounting panel 104 is coupled to a surface with adhesives, clamps or the like.

In another example, the mount 104, shown in FIG. 3, includes clasps 314A, 314B. The clasps 314A, B are sized and shaped to retain the engaging members 204A, B (FIG. 2) within the slots 300A, B. The clasp 314A extends upwardly beyond the upper portion 306 and crosses over the path of the slot 300A. The engaging member 204A engages against the clasp 314A and defines a limit of travel along the slot 300A. The clasp 314B extends across the path of the slot 300B so the engaging member 204B is limited from traveling beyond the clasp 314B. As described below, the engaging members 204A, B are moved over the clasps 314A, B and into the slots 300A, B to moveably couple the device panel 106 with the mount 104. The clasp 314A, in one example, provides an advantage as the device panel 106 and the display screen 102 may be rested upon the upper portion 306 while the engaging member 204A (FIG. 2) is positioned to move into the slot 300A of the mounting panel 102. The clasp 314A substantially prevents the display screen 102 and/or the device panel 106 from undesirably disengaging from the mount 104. Additionally, the dual slots 300A, B require disengagement of the device panel 106 from at least two locations on the mount 104. As a result, the slots 300A, B assist in preventing the device panel 106 from undesirably disengaging from the mount 104.

Optionally, the mounting panel 104 includes other features to limit the travel of the engaging members 204A, B, for instance, detents in at least one of the slots 300A, B, flexible elements coupled between the mount 104 and the display panel 106, or the like. In some embodiments, where the engaging members 204A, B include rolling bearings, the outer collar of the rolling bearing includes a projection extending from the circular surface. As at least one of the engaging members 204A, B reaches the desired limit of travel, the outer collar is sized and shaped so the projection rolls into engagement with the surface defining the slot and substantially prevents further rolling movement beyond the limit of travel.

The mounting panel may comprise any suitable material. In one example, the mounting panel 104 is constructed with plastic and is molded into the desired shape with slots 300A, B (See FIG. 3). In another example, the mounting panel is machined to form, for instance, the slots 300A, B, clasps 314A, B and flanges 310. Optionally, the mount 104 is formed with a plurality of pieces that are coupled together. In another option, the mount 104 is a single piece unit.

In some embodiments, the mount 104 is constructed with, but not limited to, polymers, metals, composites, wood or the like. Because the mount 104 has a rugged one piece construction less expensive materials such as polymers or the like can be used to form the mounting panel 104. Metal cast or machined parts are not necessary to provide strength to the mount 104 because of its robust design, although of course they may be used to form the panel. Further, the mounting panel 104 may be constructed with relatively stronger materials such as steel or the like when so desired. In another example, where a particularly heavy display screen is used with the mounting device 100, stronger materials are advantageous to improve the strength and durability of the already robust mount 104.

In another option, the mount 104 is constructed with low friction materials to facilitate movement of the device panel 106 and the display screen 102 along the slots 300A, B. In one example, the slots 300A, B are lined with a lubricant or low friction materials, such as, a grease or a polymer (e.g., a polytetrafluoroethylene registered under the trademark TEFLON® and owned by E.I. Du Pont De Nemours and Company Corporation). The engaging members 204A, B, in yet another example, include low friction materials to facilitate movement of the device panel 106. The low friction materials minimize any frictional resistance in the movement between the engaging member 204A, B and the mount 104 when it is desirable to position the display screen 102.

Figure 4:
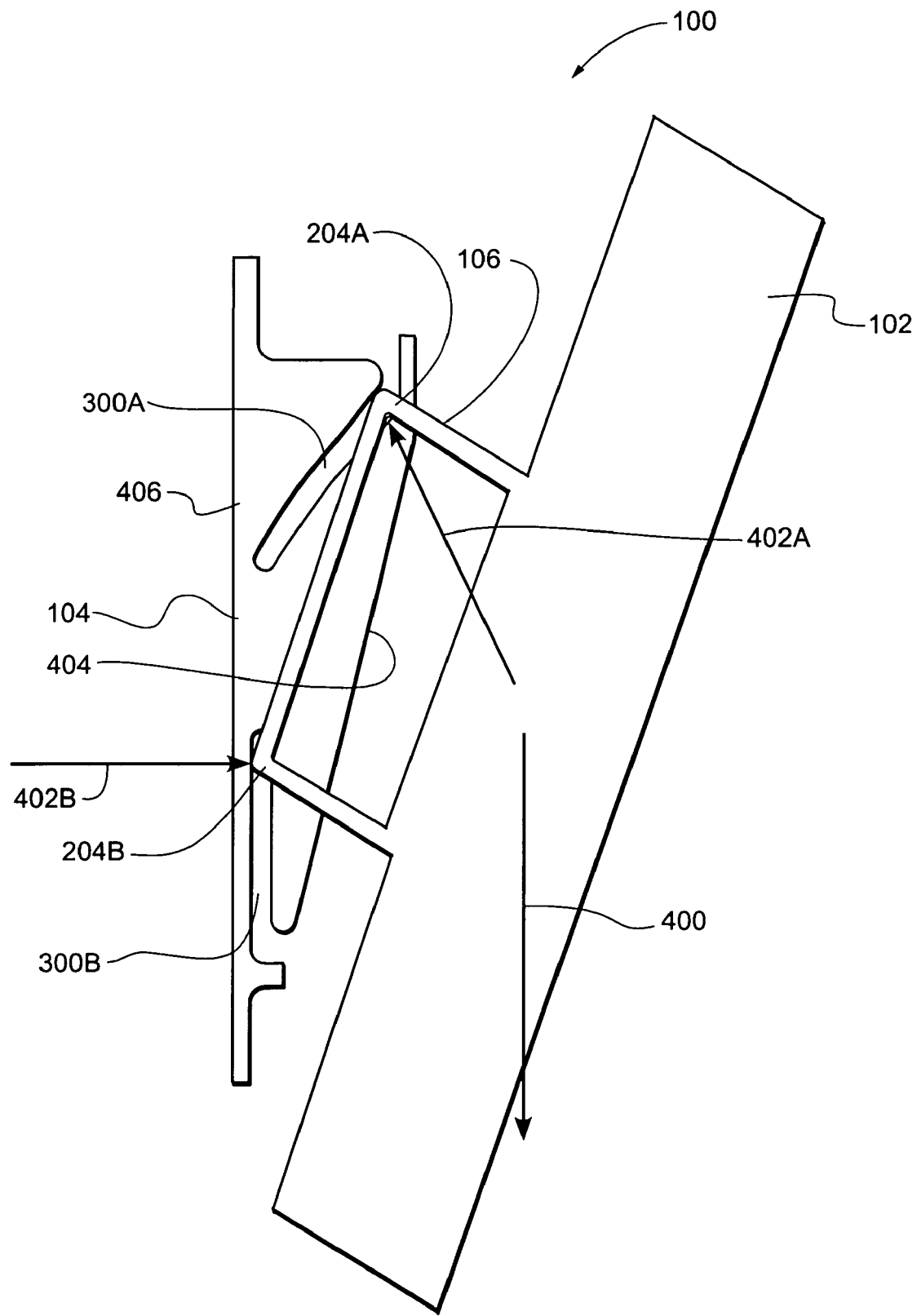
FIG. 4 shows a side view of another example of the mounting system with the device panel and the display screen in a first position.

FIG. 4 is a side view of the mounting system 100 including the device panel 106 moveably coupled with the mount 104. The device panel 106 and the display screen 102 coupled thereto are shown in a first position where the display screen 102 and panel 106 are tilted the maximum amount allowable by the slots 300A, B. The display screen 102 and the device panel 106 have a weight shown with the vector 400. The engaging members 204A, B (shown in phantom lines) engage with the mounting panel along the predetermined continuous paths of the slots 300A, B. Reaction forces shown with vectors 402A, B are generated by the engagement of the members 204A, B with the mount 104. The predetermined geometry of the slots 300A, B creates the directional components of the vectors 402A to ensure the vectors cooperatively counteract the weight vector 400.

Figure 5:
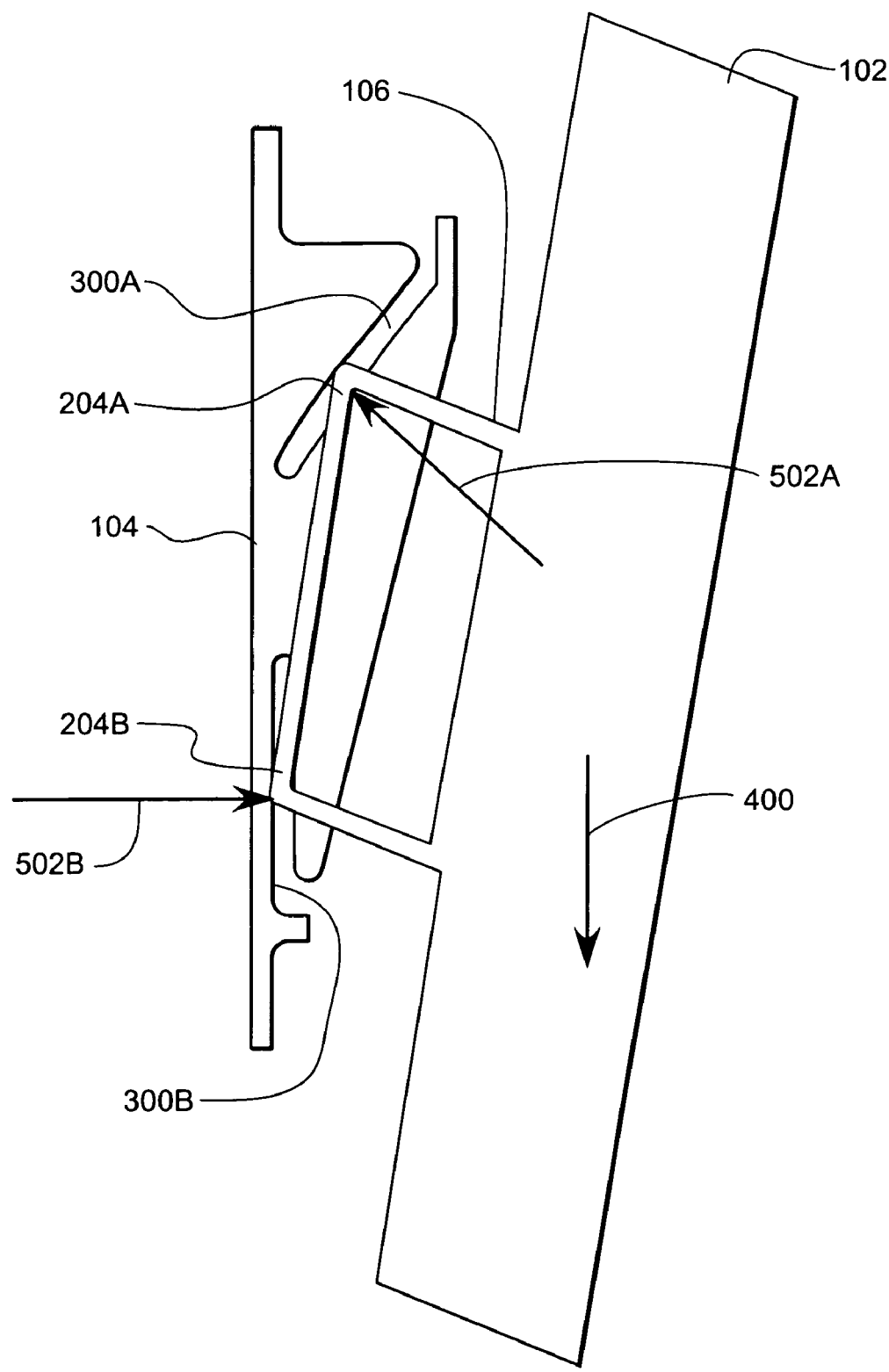
FIG. 5 shows a side view of another example of the mounting system with the device panel and the display screen in an intermediate position.

FIG. 5 is a side view of the device panel 106 coupled to the mount 104. The device panel 106 is shown in an intermediate position with the engaging members 204A, B engaged to the mounting panel 104 along the uninterrupted paths of the slots 300A, B. As shown with vector 400, the weight of the display screen 102 and the device panel 104 remains consistent and the vector 400 points in the same direction as in the first position shown in FIG. 4. Vector 502B represents the reaction force between the mount 104 and the engaging member 204B. The vector 502B remains substantially horizontal relative to the mount 104 because of the substantially vertical geometry of the slot 300B. In another example, where the slot 300B is curved and/or deviates from a vertical geometry the vector 502B correspondingly has a vertical component. Vector 502A shows the reaction force between the engaging member 204A and the mount 104. The predetermined curvature of the slot 300A adjusts the vector (502A in FIG. 5 and 402A in FIG. 4) acting between the engaging member 204A and the mounting panel 104. The geometry of the slot 300A changes the horizontal and vertical components of the vector 402A/502A and thus the direction of the vector as the engaging member 204A is moved along the slot 300A. The geometry of the slot 300A ensures the vector 502A cooperates with the vector 502B to counteract the weight of the display screen 102 and the device panel 106 in the intermediate position shown.

Moreover, the vectors between the engaging members 204A, B continue to change with movement of the device panel 106 relative to the mount 104. As a result, the vectors cooperate to counteract the moments created by the change in location of the center of gravity of the device panel 106 and the display screen 102 and thereby immobilize the panel 106 and screen 102 in any orientation along the slots 300A, B. In one example, the curved geometry of the slot 300A ensures the display screen 102 and the device panel 106 are continuously immobilized after selective positioning along the uninterrupted slots 300A, B. In another example, the vectors cooperate to continuously immobilize the device panel 106 as the engaging members 204A, B are smoothly moved along the uninterrupted and substantially continuous slots 300A, B. The vectors thereby cooperate to immobilize the device panel 106 and the display screen 102 as they are continuously positioned along the slots 300A, B.

As shown in FIGS. 4 and 5 the engaging members 204A, B are spaced apart a predetermined distance. In one example, the engaging members 204A, B are spaced to allow reception of the members 204A, B in the slots 300A, B and to allow coupling of the device panel 106 to the mount 104. In another example, the engaging members 204A, B are spaced a predetermined to distance so the travel of the engaging member 204A corresponds to the travel of the engaging member 204B in slots 300A, B. As the engaging member 204A reaches the limit of its travel in the slot 300A the engaging member 204B reaches the limit of its travel in the slot 300B.

Referring again to FIG. 4, the mount 104 includes a sloped portion 404. In one example, the sloped portion 404 is sized and shaped to avoid contact with the device panel 106 and the display screen 102. The sloped portion 404 allows the device panel 106 and the display screen 102 to engage in a full range of movement with the engaging members 204A, B traveling within the slots 300A, B. Additionally, the sloped portion 404 substantially prevents interference with the reaction forces (e.g., vectors 402A, B and 502A, B) that counteract the weight of the display screen 102 and the device panel 106 to continuously immobilize the same. The sloped portion 404, in another example, is robustly constructed (e.g., as shown in figure 4) to minimize stresses created by engagement of the engaging members 204A, B to the mount 104. Stresses caused by the engaging members 204A, B particularly with heavy display screens 102 are spread throughout the sloped portion 404 to increase the durability of the mount 104.

In operation, the mount 104 is coupled to a surface such as a wall, ceiling, columnar member or the like. In one example shown in FIG. 3, the mount 104 is secured to the surface through the flanges 310 as described above (e.g., with bolts or the like extending through the openings 312). The device panel 106 is coupled to the display screen 102 (FIG. 1). In another example, the device panel 106 is coupled to the display screen 102 with bolts, bosses, adhesives or the like. Optionally, the display screen 102 is coupled to the device panel 106 after the device panel 106 is coupled to the mount 104.

Referring now to FIGS. 2 and 3, the device panel 106 is coupled to the mount 104 by positioning the engaging member 204A between the clasp 314A and the flange 310 adjacent the upper portion 306. The engagement member 204A is positioned within the slot 300A and sized and shaped to move along the substantially uninterrupted slot 300A. The device panel 106 is lowered with respect to the mount 104. The engaging member 204A follows this movement and moves along the slot 300A toward a trough 316. Once the engaging member 204A is substantially adjacent to the trough 316 the device panel 106 is swung toward the mounting panel 104 and the engaging member 204B is positioned within the slot 300B adjacent to the clasp 314B. The engaging members 204A, B engage against the mount 104 and are moveable within the slots 300A, B (FIGS. 4 and 5).

As shown in FIGS. 4 and 5, the device panel 106 and the display screen 102 are positioned relative to the mount 104 by application of pressure to the screen 102 or the panel 106 (e.g., by hand). In one option, rolling bearings coupled around the engaging members 204A, B to facilitate positioning of the display screen 102 relative to the mount 104. The rolling bearings additionally allow easy movement of substantially any display screen used with the mounting device 100. For example, a display screen that would be difficult to position because of its size and/or weight is more easily positioned with the mounting device 100 and the rolling bearings.

Referring now to FIG. 6, a block diagram for a method 600 of using a mounting device is shown. The mounting device (e.g., mounting device 100) is shown in FIGS. 4 and 5 and is referred to below. At block 602, the device panel 106 is selectively positioned relative to a mounting panel 104. In one example, the display screen 102 is coupled to the device panel 106. Engaging members 204A, B are moveably coupled between the device panel 106 and the mounting panel 104 and received within the first and second substantially continuous slots 300A, B of the mount 104. The slots 300A, B, in one example, are substantially featureless (i.e., without notches, recesses or the like) and allow for smooth continuous movement of the engaging members 204A, B therein.

The mount may allow for any desirable range of angles. For example, the device panel 106 can be positionable at least about 15 degrees backward and about 45 degrees forward relative to a vertical axis coincident with a mounting surface 406 of the mount 104. In another embodiment, the device panel 106 can be positionable at least about 10 degrees backward and about 35 degrees forward relative to a vertical axis coincident with a mounting surface 406 of the mount 104. In yet another embodiment, the device panel 106 can be positionable at least about 5 degrees backward and about 25 degrees forward relative to a vertical axis coincident with a mounting surface 406 of the mount 104. Optionally, the slots 300A, B are positioned along the mount 104 so the device panel 106 travels at least 45 degrees above and below a horizontal axis perpendicular to the vertical axis.

At block 604, the device panel 106 is continuously immobilized relative to the mount 104 at multiple unprescribed locations within the range of movement provided by the slots 300A, B. The first and second engaging members 204A, B are engaged against the mount 104. The first and second slots 300A, B are sized and shaped to receive the engaging members 204A, B. The reaction forces between the first and second engaging members 204A, B and the mount 104 cooperate to continuously counteract the weight of the device panel 106 and/or the display screen 102 when the engaging members 204A, B are in substantially any position along the respective slots 300A, B. The device panel 106 and/or display screen 102 are thereby continuously immobilized relative to the mount 104. Application of additional pressure to the device panel 106 and/or the display screen 102 facilitates movement of the same relative to the mounting panel 104. Once pressure is removed from the device panel 106 and/or the display screen 102 the reaction forces between the engaging members 204A, B and the mount 104 work to continuously immobilize the panel 104 and/or display screen 102 anywhere along the continuous slots 300A, B. Importantly, the slots 300A, B and the cooperation of the device panel 106 with the mount 104 allows a single mounting device 100 to support and continuously position a variety of display screens with different weights and dimensions. With this single mounting device, no change in the design are needed for differing display screens, thereby providing a mounting device with a consistent cost.

Figure 7:
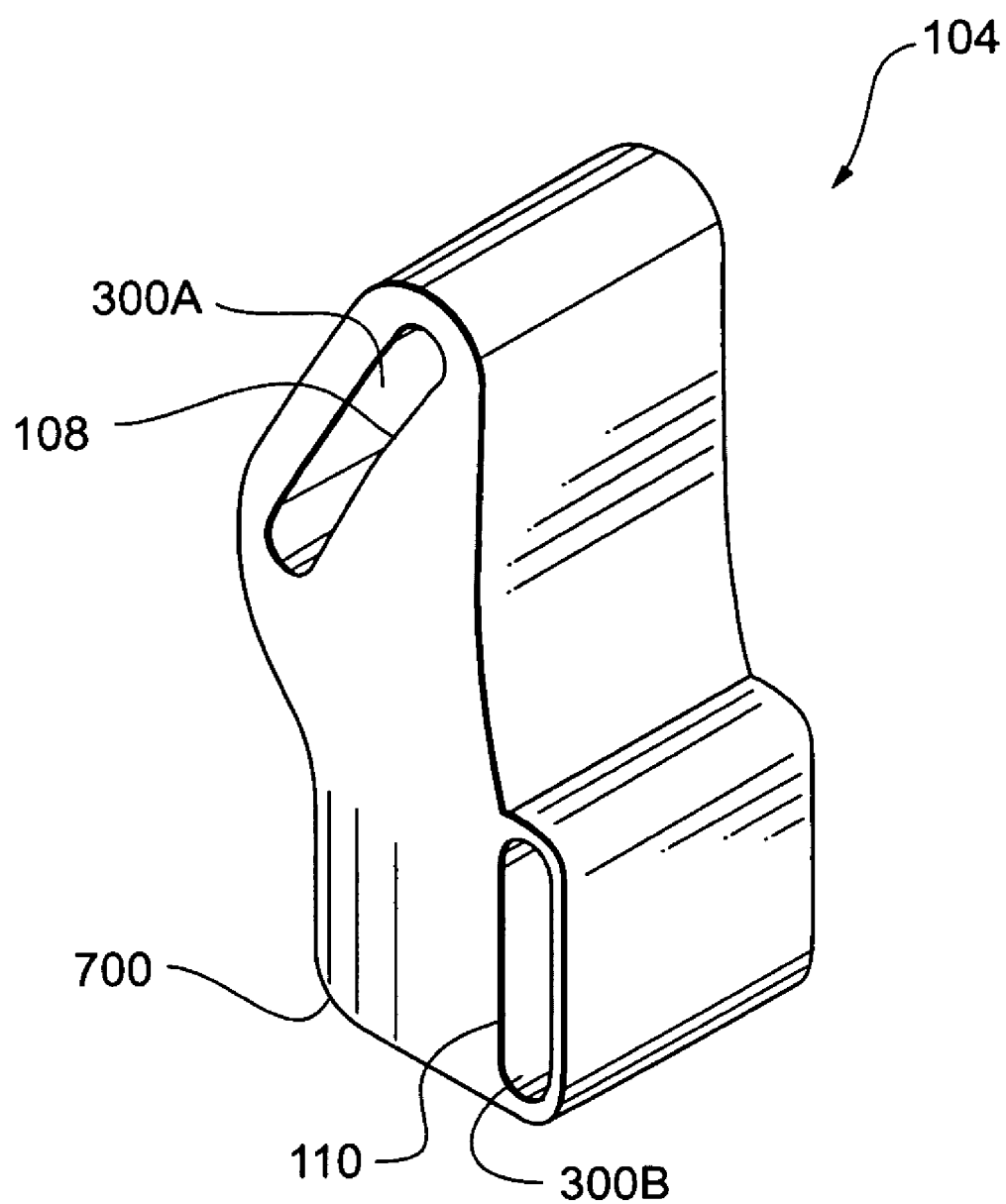
FIG. 7 shows a perspective view of a mount in accordance with an embodiment of the invention.

As discussed above, the first and second surfaces 108, 110 may be provided in any suitable form or configuration. As shown in FIG. 7, first surface 108 may be offset from second surface 110. This configuration is but one example that allows the mount to be supported by a member received within its bottom surface 700, as described further below.

Figure 8:
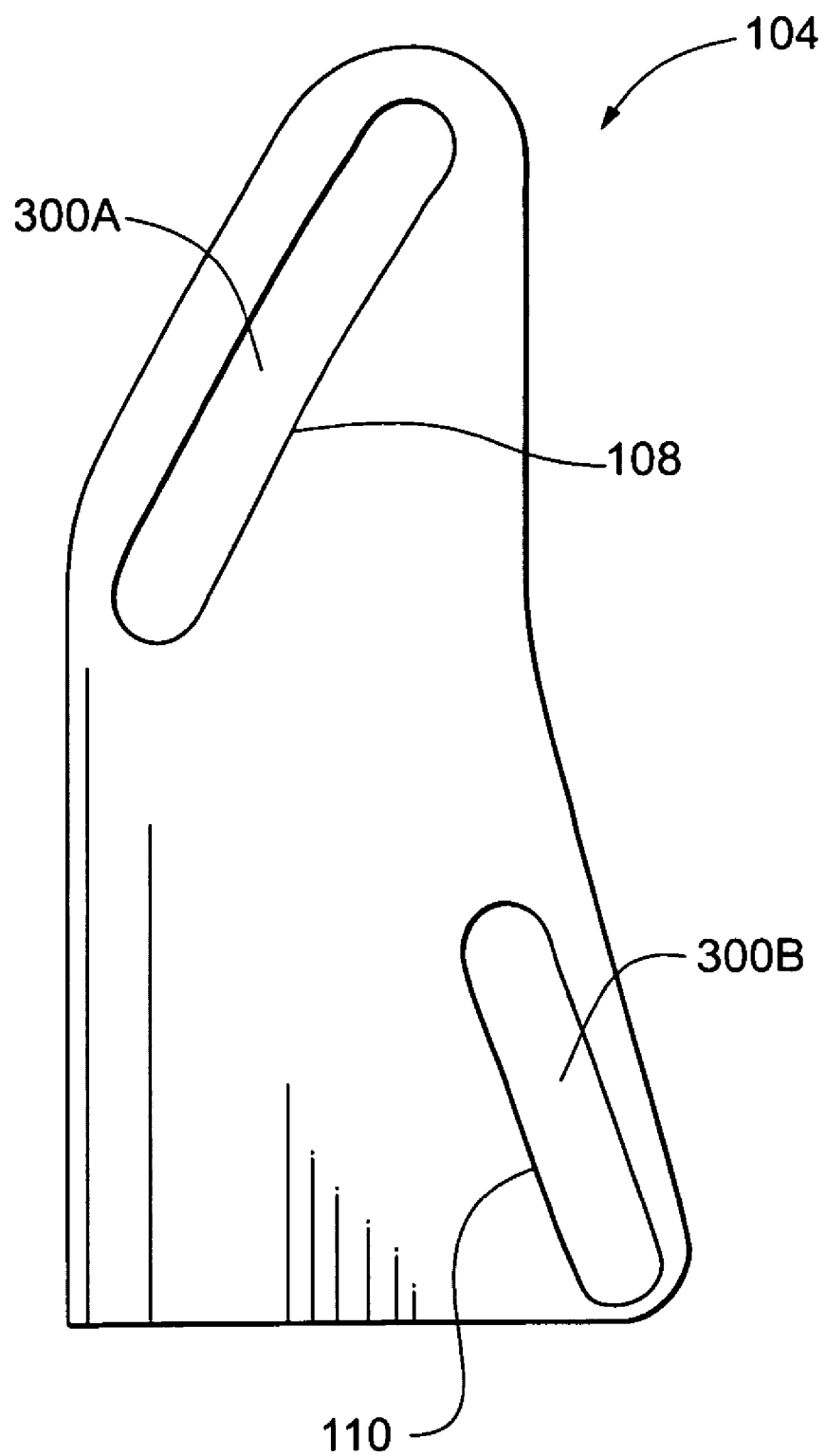
FIG. 8 shows a side plan view of a mount in accordance with an embodiment of the invention.
Figure 9:
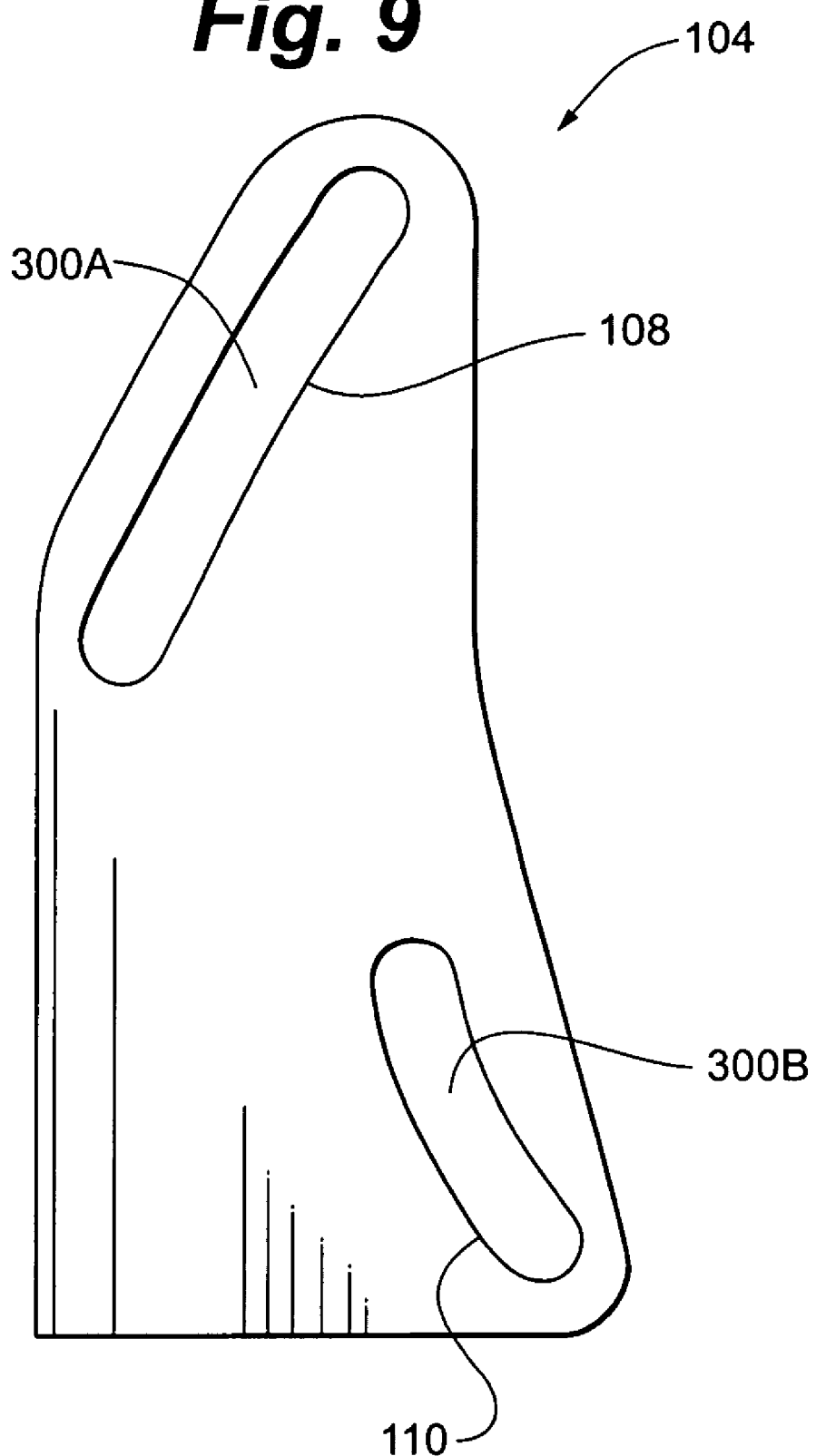
FIG. 9 shows a side plan view of a mount in accordance with an embodiment of the invention.
Figure 10:
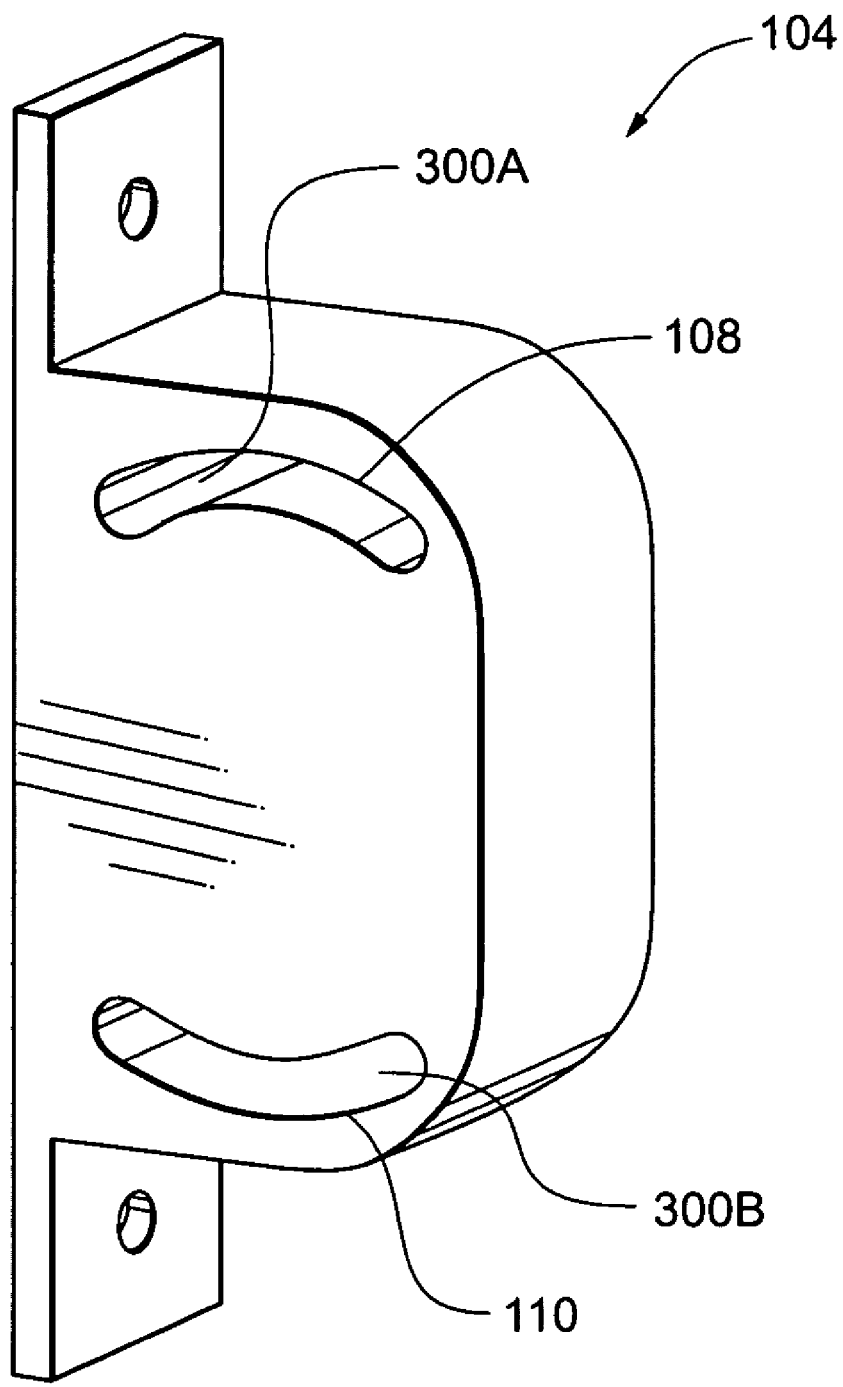
FIG. 10 shows a perspective view of a mount in accordance with an embodiment of the invention.
Figure 11:
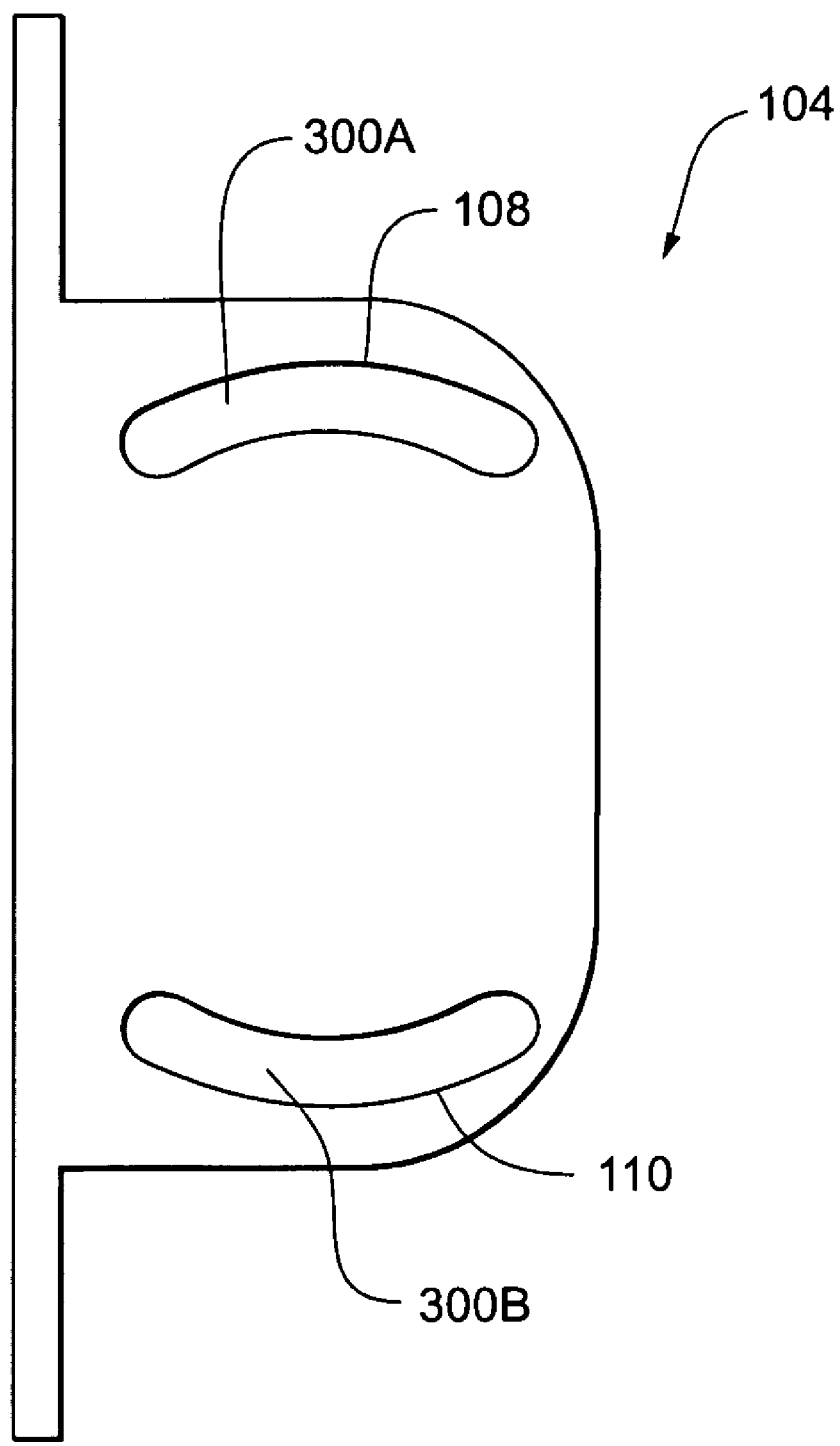
FIG. 11 shows a side plan view of a mount in accordance with an embodiment of the invention.

In the embodiment of FIG. 7, first surface 108 is included within first slot 300A, and second surface 110 is included within second slot 300B. In this embodiment, slots 300A and 300B are enclosed to retain first and second engaging members 204A and 204B (not shown in FIG. 7). In addition, first slot 300A is generally curved and second slot 300B is generally vertical and linear. In the embodiment of FIG. 8, however, second slot 300B is generally linear but is offset from a vertical position. In the embodiment of FIG. 9, both first and second slots 300A, 300B, are generally curved. Another example is shown in the embodiment of FIGS. 10 and 11. In FIGS. 10 and 11, both first and second slots 300A, 300B are curved and are generally symmetrical about a horizontal axis. It should be noted that, in some embodiments, first and second surfaces 108, 110 may switch sides during movement within the range of positions allowed by the mount. In addition, in embodiments that provide the first and second surfaces within a slot, the surfaces may includes the entire circumferential surface of the slot.

Figure 12B:
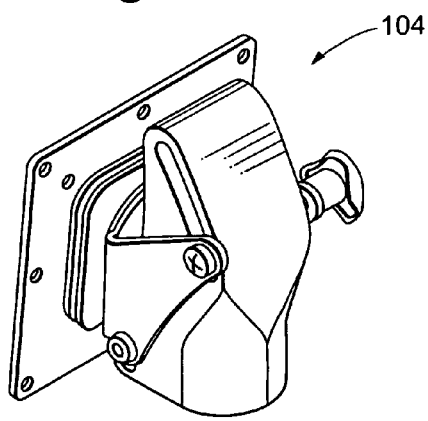
FIG. 12B shows a perspective view of a mounting system in accordance with an embodiment of the invention.

In some embodiments, a locking feature may be provided to lock the display into a desired position. Such embodiments are particularly useful for applications such as computer displays located in work areas. Such displays may accidentally be bumped with sufficient force to move the display from a desired position. An example of a mounting system 100 with a locking feature is shown in FIG. 12A. In the embodiment of FIG. 12A, first and second engaging members 204A, 204B, comprise pins 1200 and rollers 1202. The pins and rollers are received within apertures 1206 provided on device panel 106. In some embodiments, at least one of the pins 1200 may comprise a bolt adapted to be received within a knob 1208. In such embodiments, a user can tighten the knob to lock the display into a desired position. FIG. 12B shows the mounting system of FIG. 12A in an assembled view.

Figure 13:
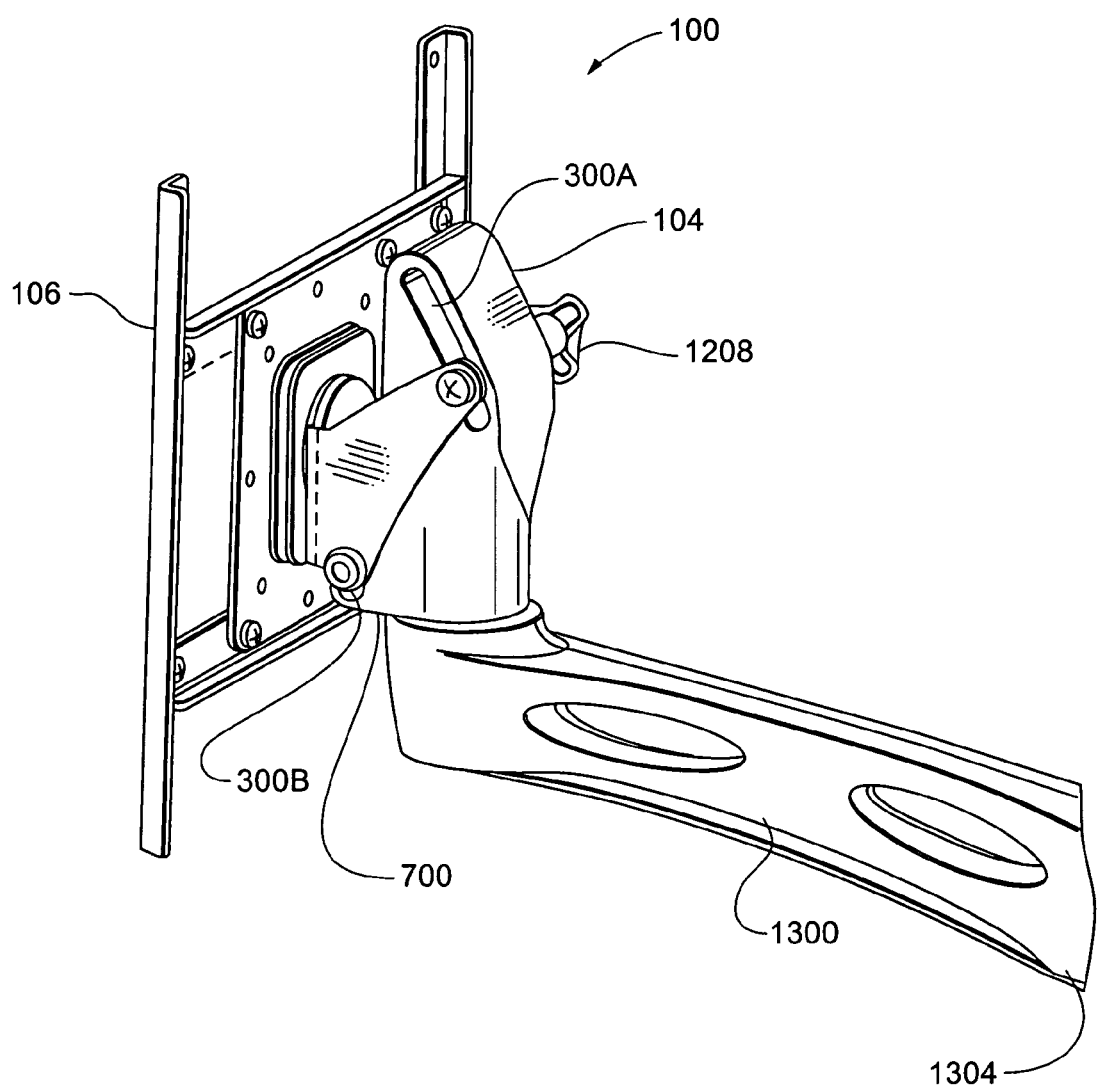
FIG. 13 shows a perspective view of a mounting system supported by an arm in accordance with an embodiment of the invention.

The mounting system may be supported by any suitable method. FIG. 13 shows a mounting system 100 supported by an arm 1300. Such an arm 1300 may rotatably support the mounting system by a peg (not shown in FIG. 13) received within the bottom surface 700 of the mount 104. Such an arrangement allows the mounting system to rotate about the support arm 1300 to provide for additional adjustment of a display. In some embodiments, the arm 1300 may itself be adjusted about its proximate end 1304. Such adjustment may include, for example, vertical and/or horizontal adjustment.

Figure 14A:
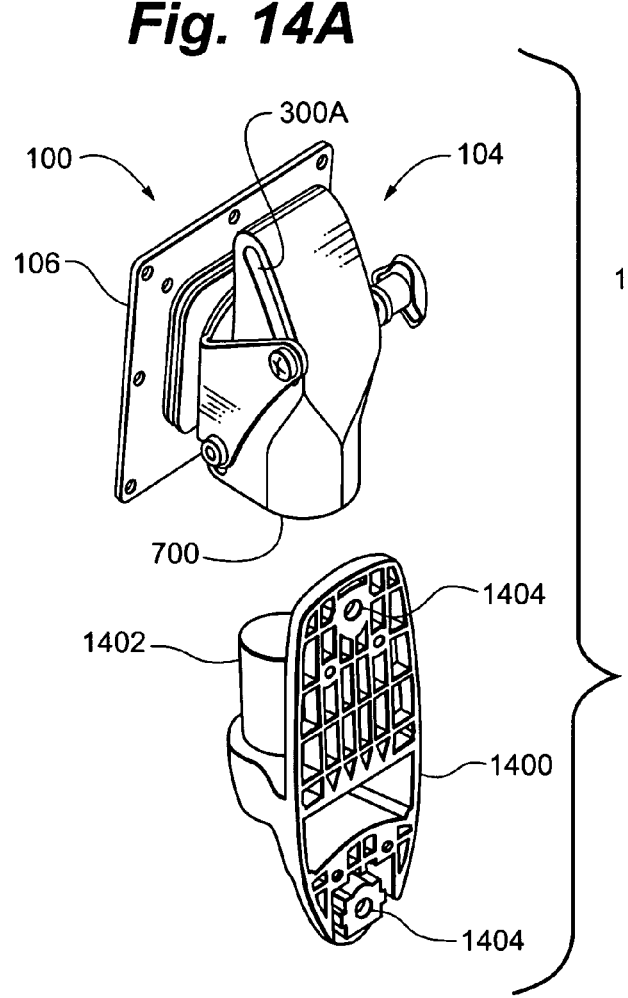
FIG. 14A shows an expanded perspective view of a mounting system supported by a support mount in accordance with an embodiment of the invention.
Figure 14B:
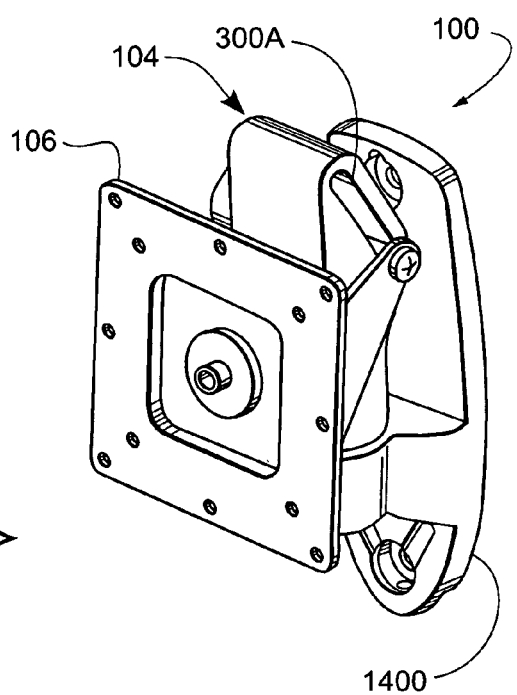
FIG. 14B shows a perspective view of a mounting system supported by a support mount in accordance with an embodiment of the invention.

FIG. 14A shows a mounting system 100 adapted to be supported by a surface mount 1400. Such a system is useful for rotatably and pivotably supporting a display on a vertical surface, such as a wall. In some embodiments, surface mount 1400 may comprise a peg 1402 adapted to be received within a bottom surface 700 of mount 104. Such a system allows the mount 104 to rotate about the peg 1402. The surface mount 1400 may be coupled to a support surface by any suitable means, including, for example, by bolts or screws retained within apertures 1404. FIG. 14B shows the mounting system of FIG. 14A in an assembled view.

Figure 15:
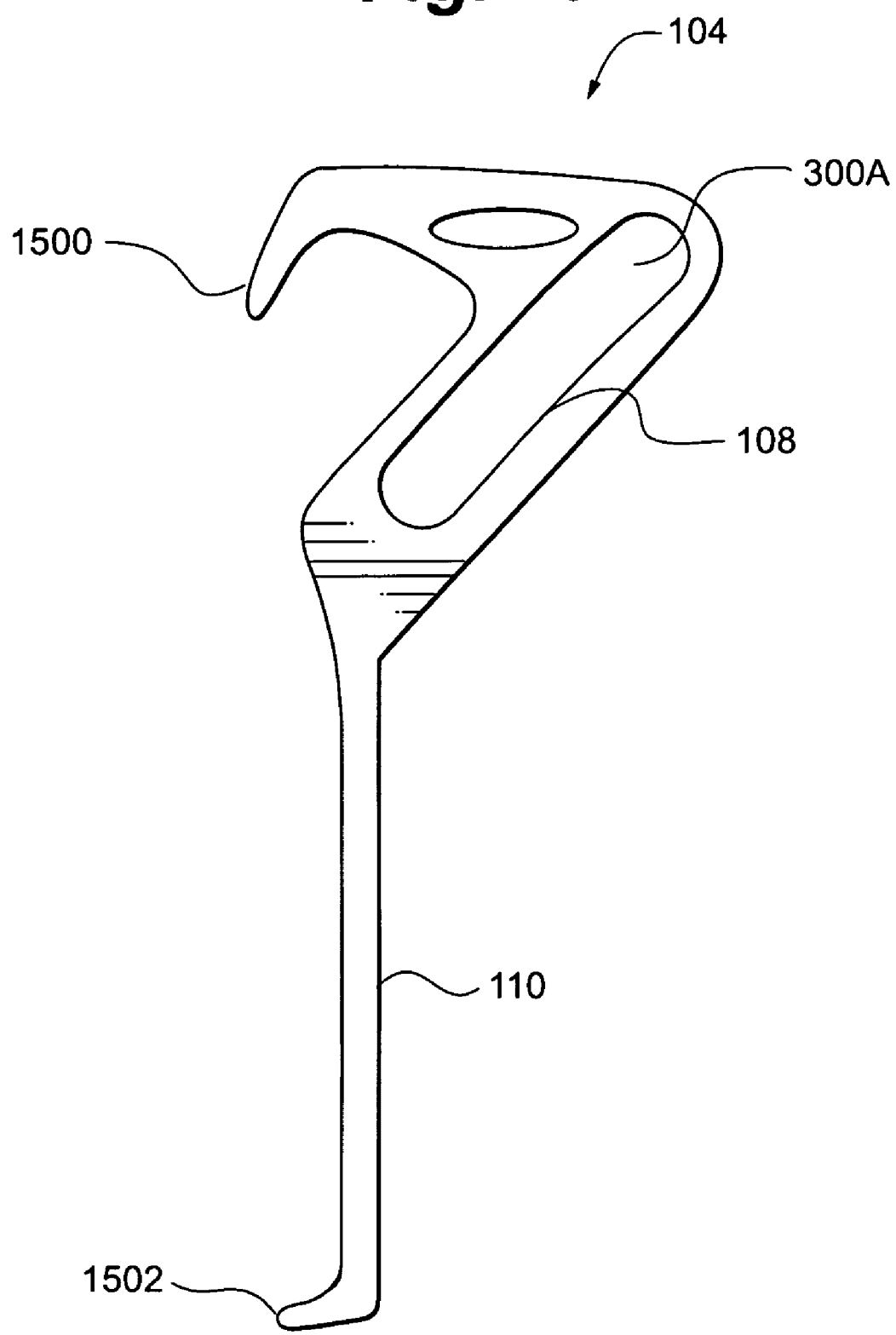
FIG. 15 shows a side plan view of a mount in accordance with an embodiment of the invention.
Figure 16A:
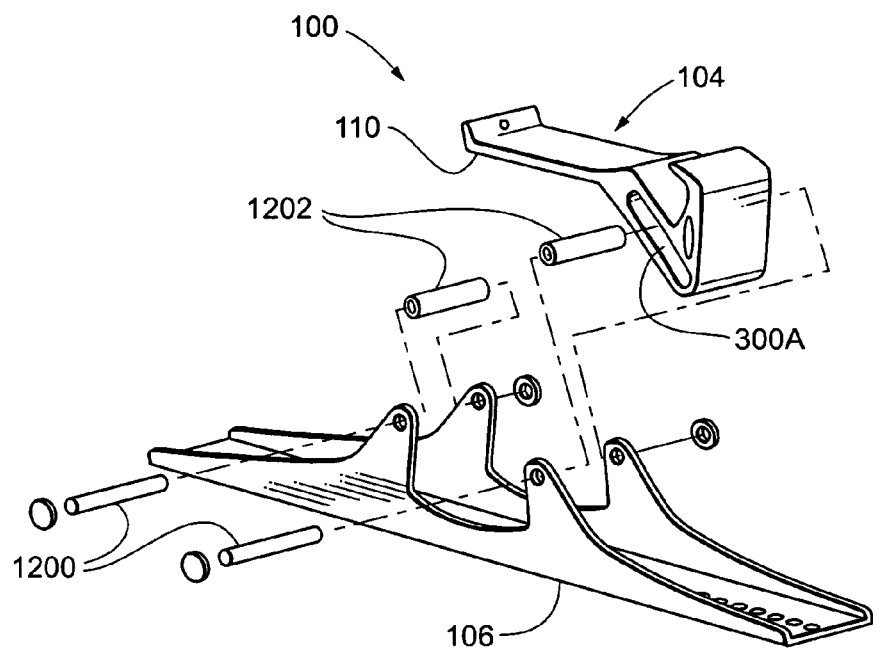
FIG. 16A shows an exploded view of a mounting system in accordance with an embodiment of the invention.
Figure 16B:
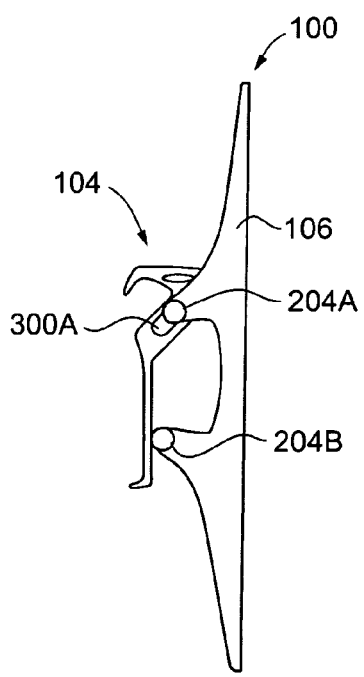
FIG. 16B shows a side plan view of a mounting system in accordance with an embodiment of the invention.
Figure 16C:
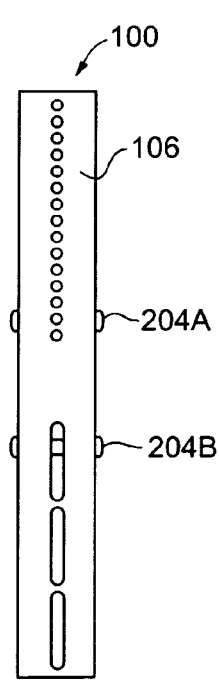
FIG. 16C shows a front plan view of a mounting system in accordance with an embodiment of the invention.
Figure 16D:
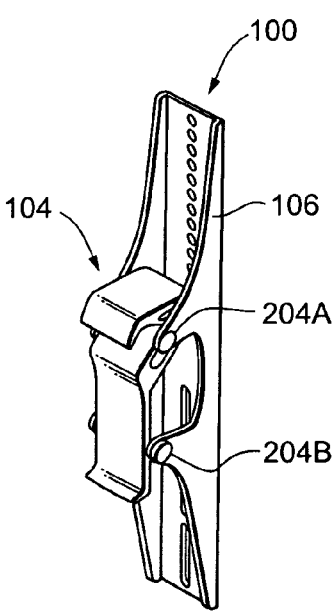
FIG. 16D shows a perspective view of a mounting system in accordance with an embodiment of the invention.

Some embodiments of the mounting system 100 are adapted to support and provide adjustment to relatively large displays. An embodiment of a mount 104 useful in such a system is FIG. 15. In FIG. 15, mount 104 may have a first surface 108 included within a slot 300A and a second surface 110 that is not included within a slot. Further, one or more retaining features 1500, 1502 may be provided to retain the mount 104 on a support structure, such as a wall bracket, as described further below.

FIGS. 16A-D show the mount 104 of FIG. 15 coupled to a device panel 106. Device panel 106 may support relatively large displays. In the embodiment shown, engaging members 204A,B comprise pins 1200 and rollers 1202. Rollers 1202 may comprise any suitable material, such as nylon. Optionally, ball bearings may be provided.

Figure 17:
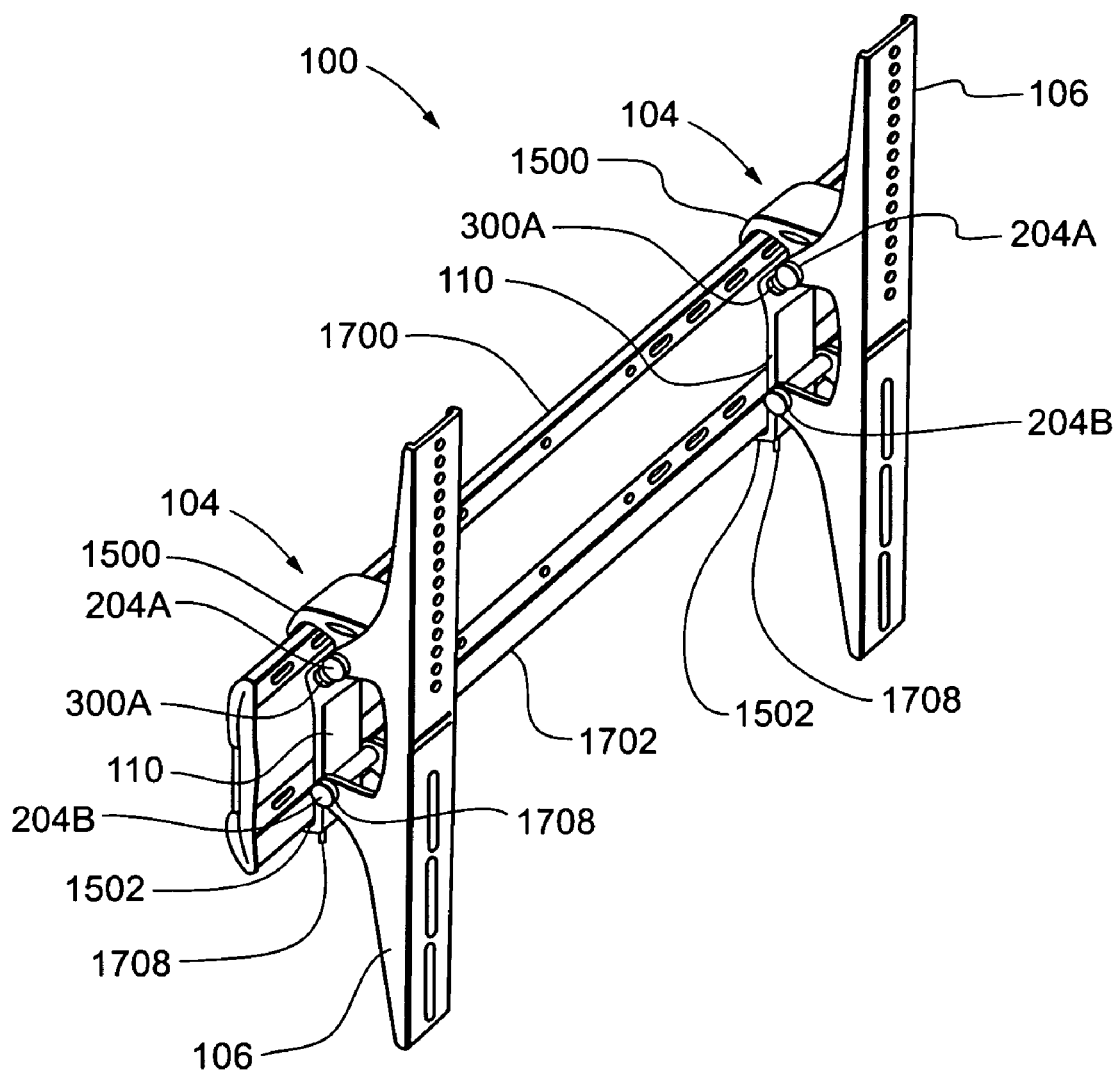
FIG. 17 shows a perspective view of a mounting system in accordance with an embodiment of the invention.
Figure 18:
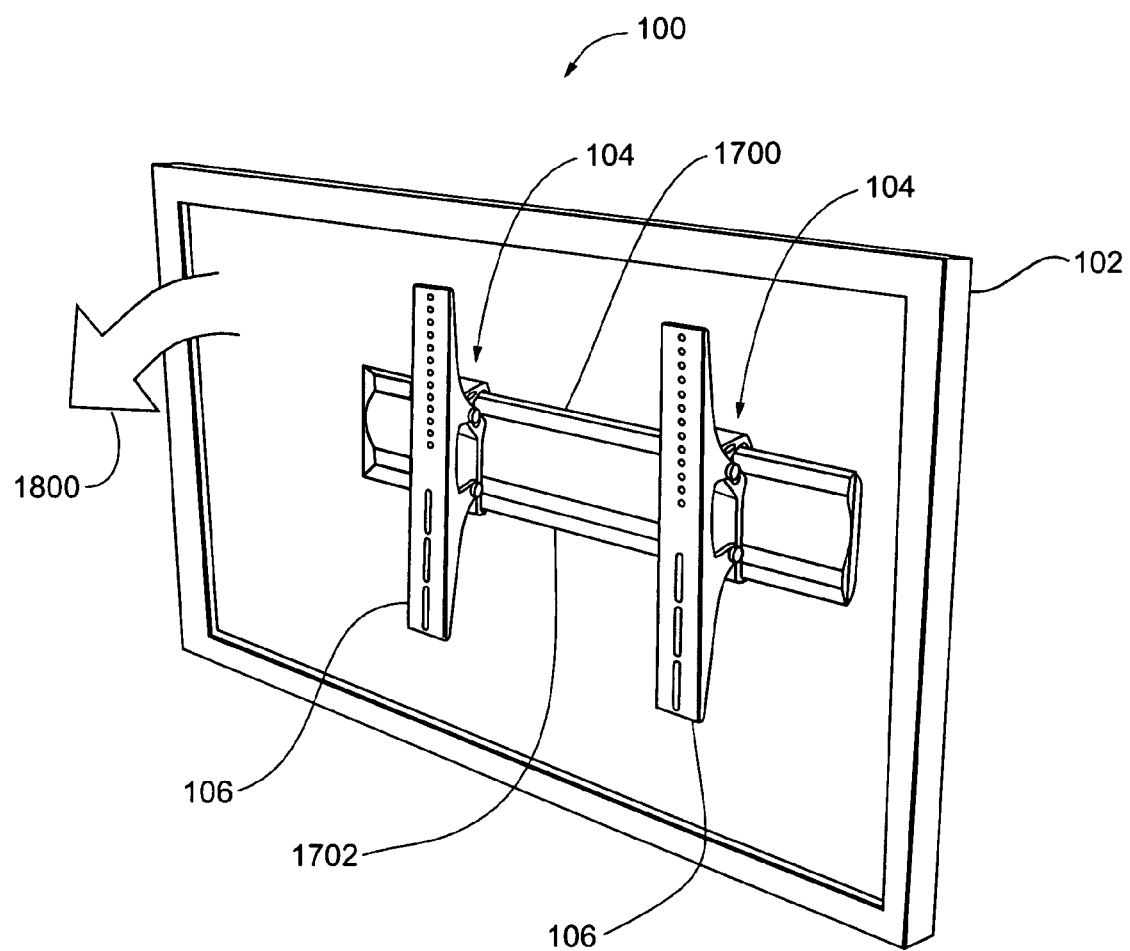
FIG. 18 shows a perspective view of a mounting system in accordance with an embodiment of the invention.

FIG. 17 shows an assembled mounting assembly 100 including the embodiments shown in FIGS. 15 and 16A-D. In the embodiment of FIG. 17, two device panels 106 are provided to be coupled to a display. Each device panel 106 is coupled to first and second engaging members 204A,B. Engaging member 204A engages with a first surface 108 within first slot 300A, and engaging member 204B engages with second surface 110. Brackets 1700, 1702 are provided to be coupled to a support surface such as a wall. The brackets may be provided on a single or separate members. Retaining feature 1500 may be engaged with bracket 1700 and retaining feature 1502 may be engaged with bracket 1702 to couple the mount 104 to the brackets 1700, 1702. In such a system, the device panels 104 may move along mounts 1700, 1702 in a sliding fashion until they are optionally secured. For example, they may be secured by tightening a compression bolt 1708 against one ore more of the brackets 1700, 1702. In some embodiments, such a bolt 1708 may be drivable with a specially adapted tool to deter unauthorized individuals, such as thieves, from removing the display from the support surface. Such a system 100 is useful for allowing a user to efficiently and securely mount a relatively large panel display to support surface such as a wall and to provide easy tilt adjustment of the display after installation in the direction of arrow 1800 as shown in FIG. 18.

Figure 19:
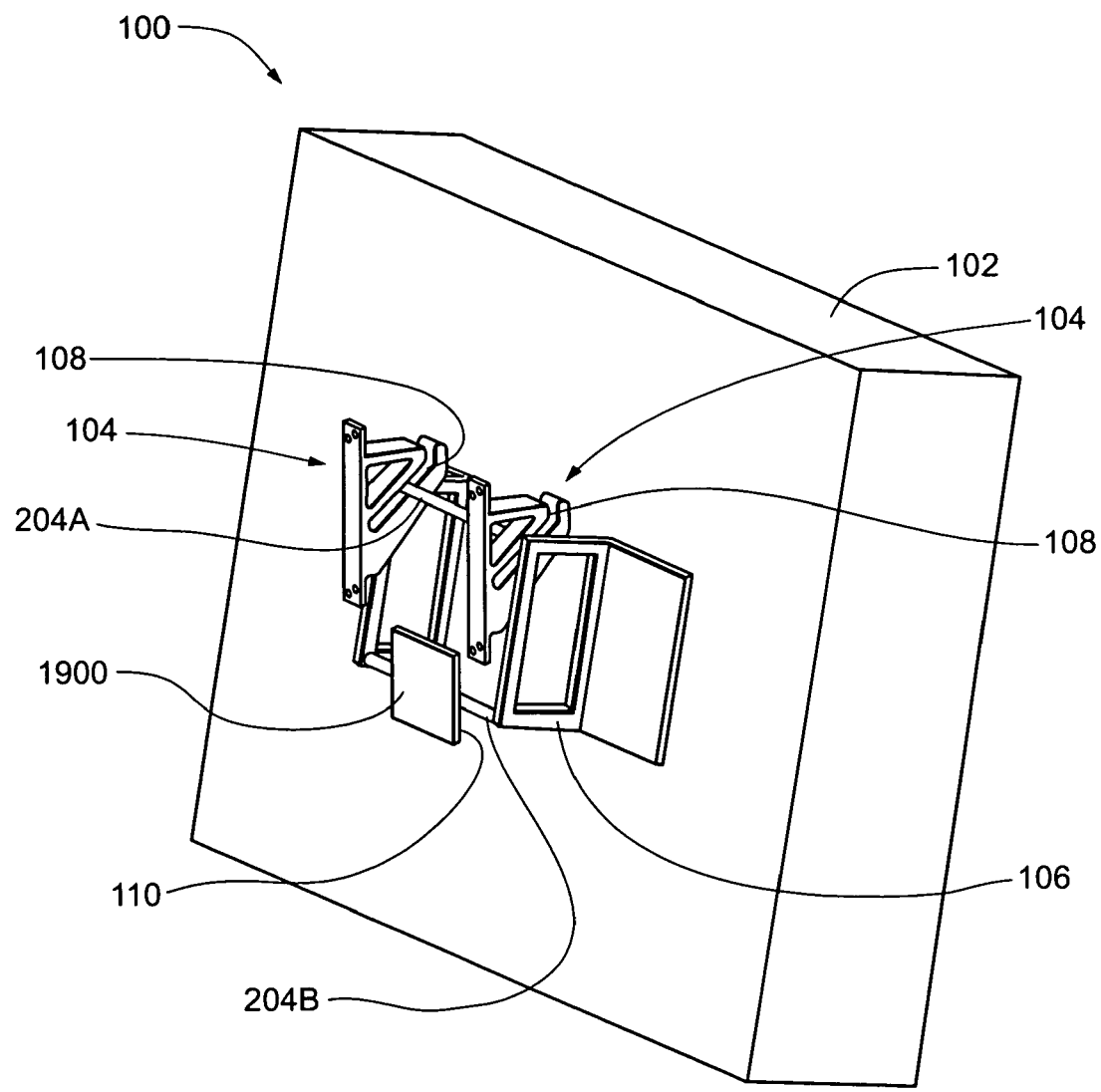
FIG. 19 shows a perspective view of a mounting system in accordance with an embodiment of the invention.

FIG. 19 shown another example of a mounting system 100. In the embodiment shown in FIG. 19, second surface 110 is provide on separate member 1900. Separate member 1900 may be an existing surface, such as a wall, or it may be a substrate that can be secured to a support surface. Such a system is useful for utilizing the stability of existing support structures, as well as lowering costs by providing fewer parts to the user.

Figure 20:
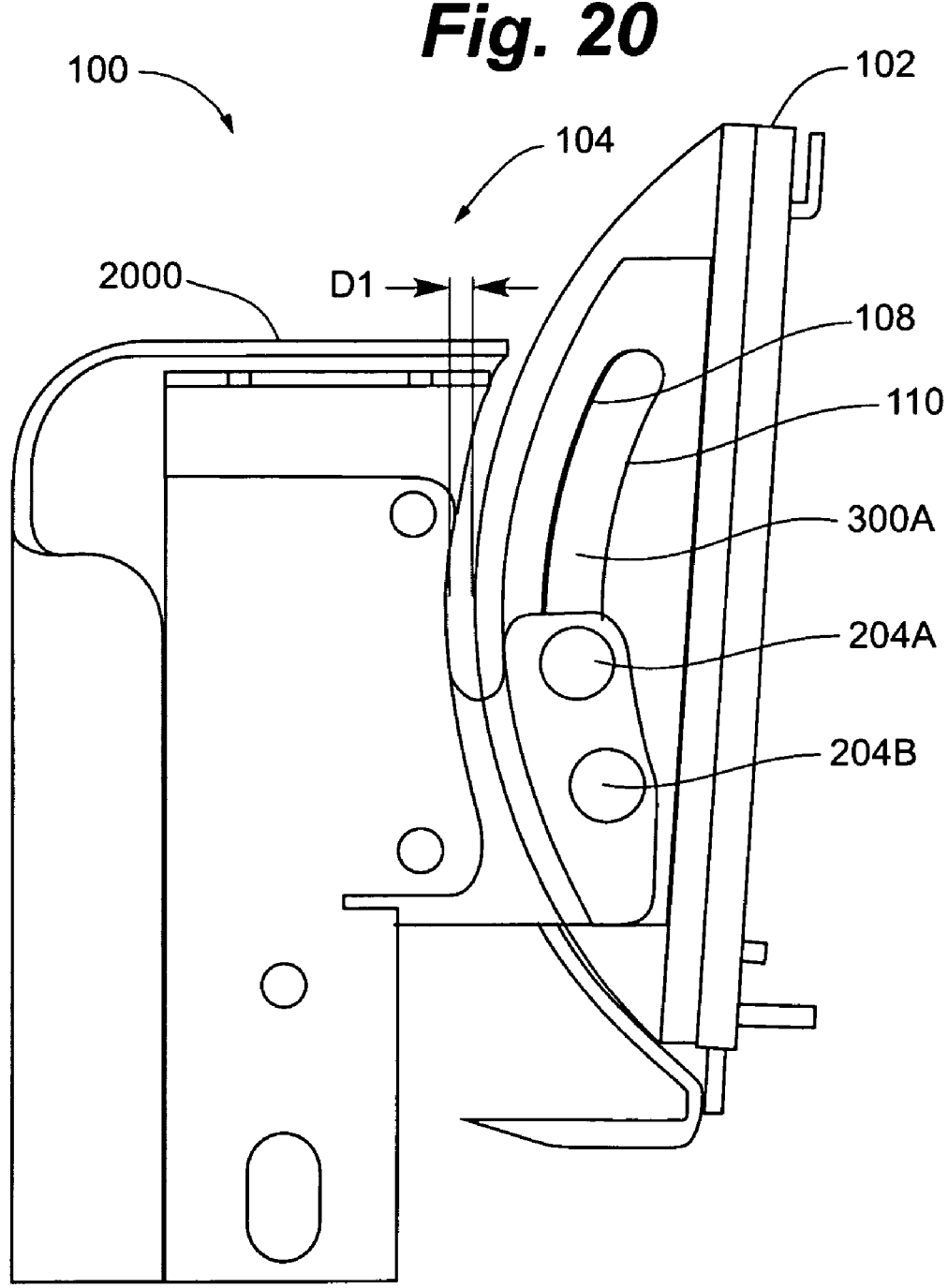
FIG. 20 shows a side plan view of a mounting system in accordance with an embodiment of the invention.
Figure 21:
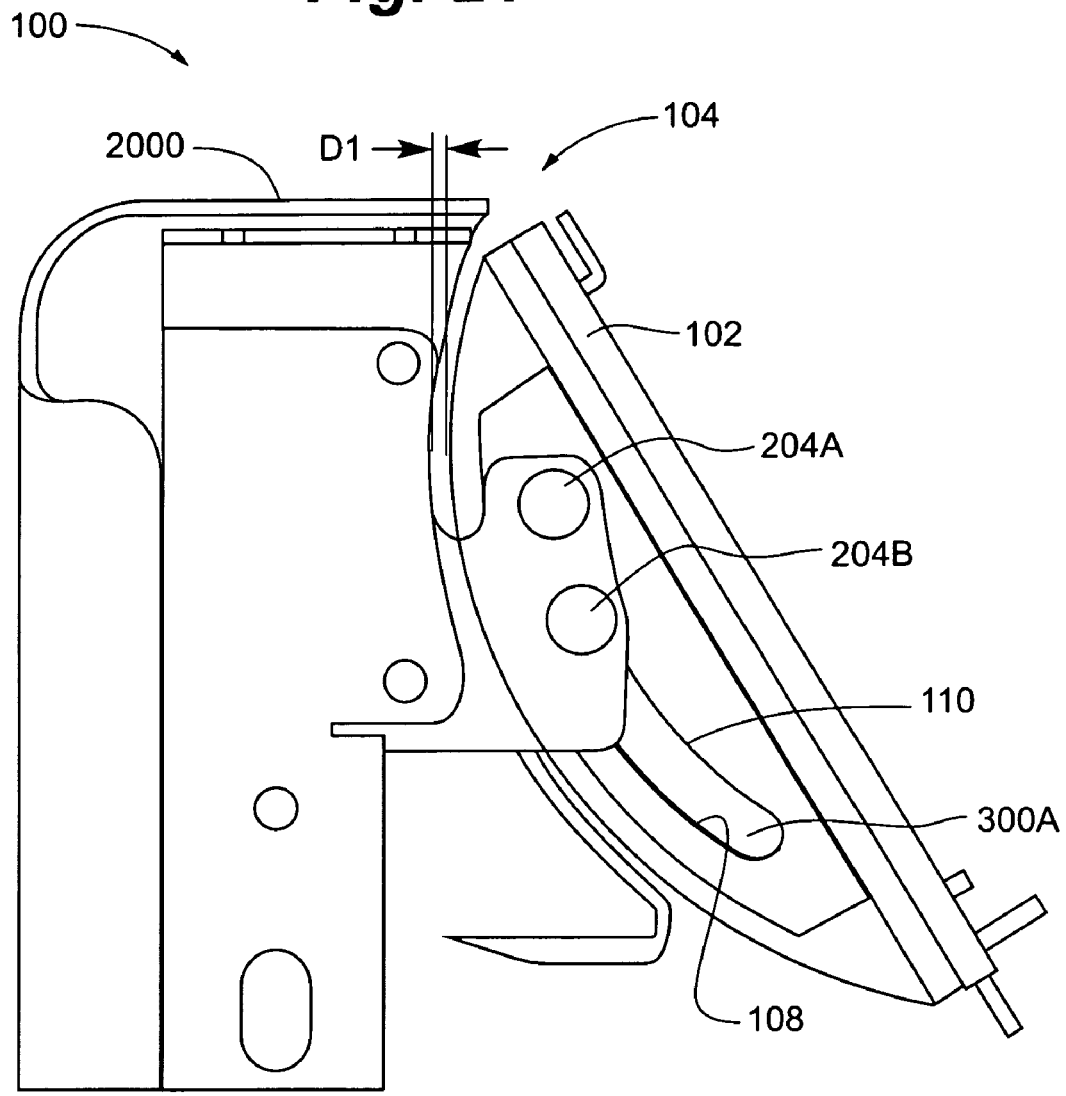
FIG. 21 shows a side plan view of a mounting system in accordance with an embodiment of the invention.
Figure 22:
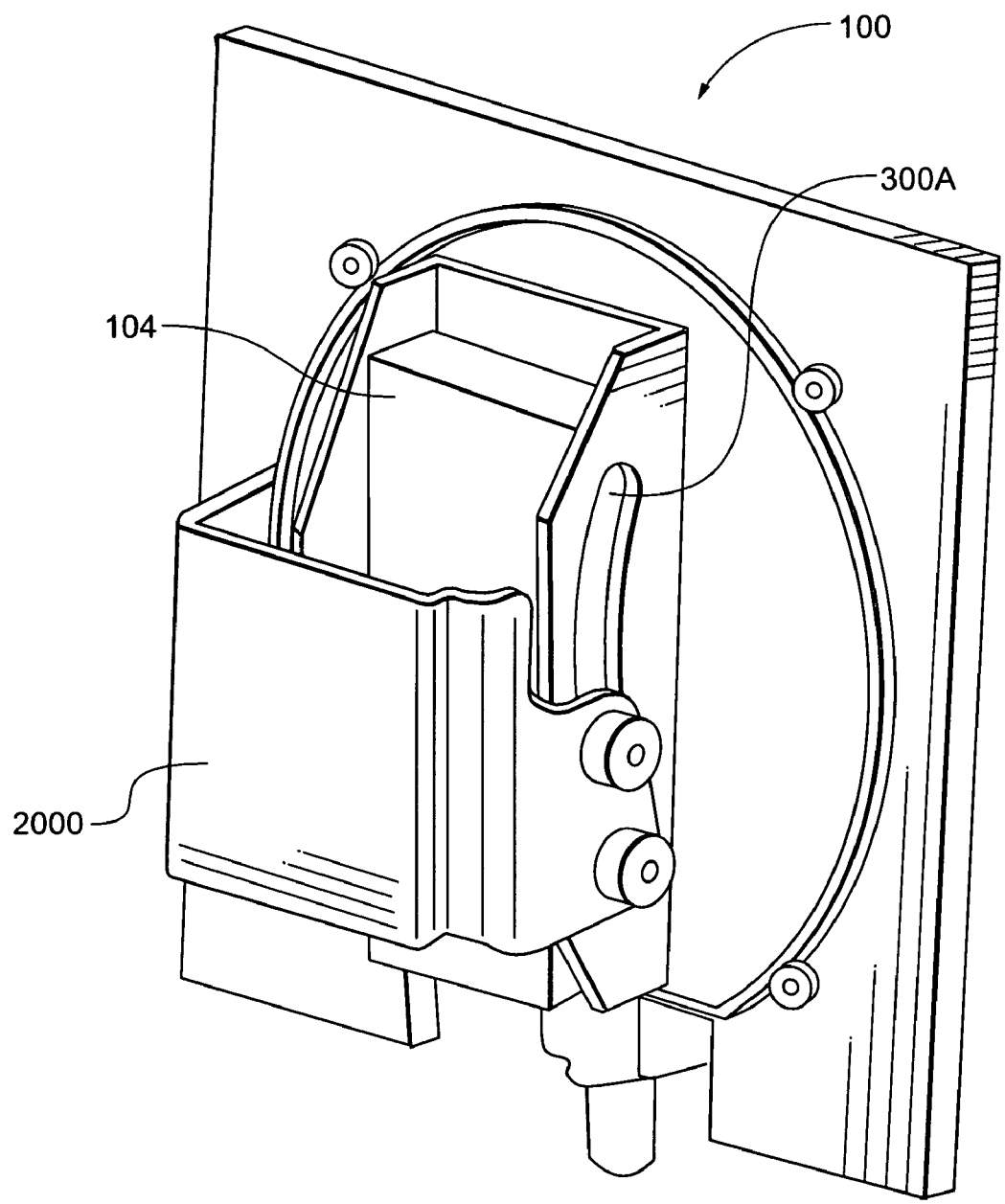
FIG. 22 shows a perspective view of a mounting system in accordance with an embodiment of the invention.

FIGS. 20-22 shown an embodiment of a mounting system 100 adapted to minimize a gap between a display 102 and a support 2000. FIG. 20 shows such a system in a first extreme position, and FIG. 21 shows such a system in a second extreme position. Note that a distance D1 between the display 102 and support 2000 stays relatively constant between the two shown positions. In the embodiment shown, first surface 108 and second surface 110 are included within the first slot 300A, which is carried by (e.g., functionally coupled to) the display.

Figure 23:
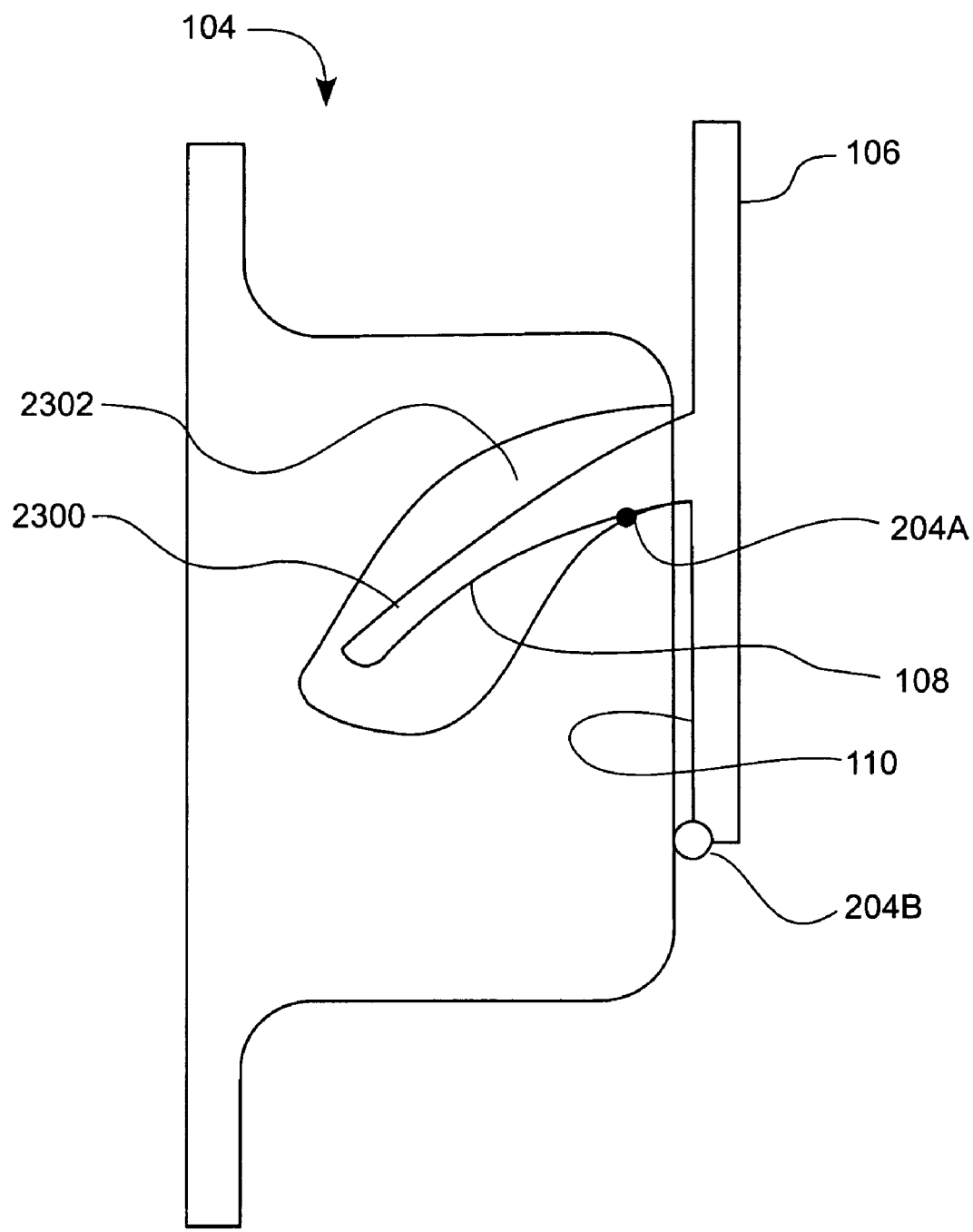
FIG. 23 shows a side plan view of a mounting system in accordance with an embodiment of the invention.
Figure 24:
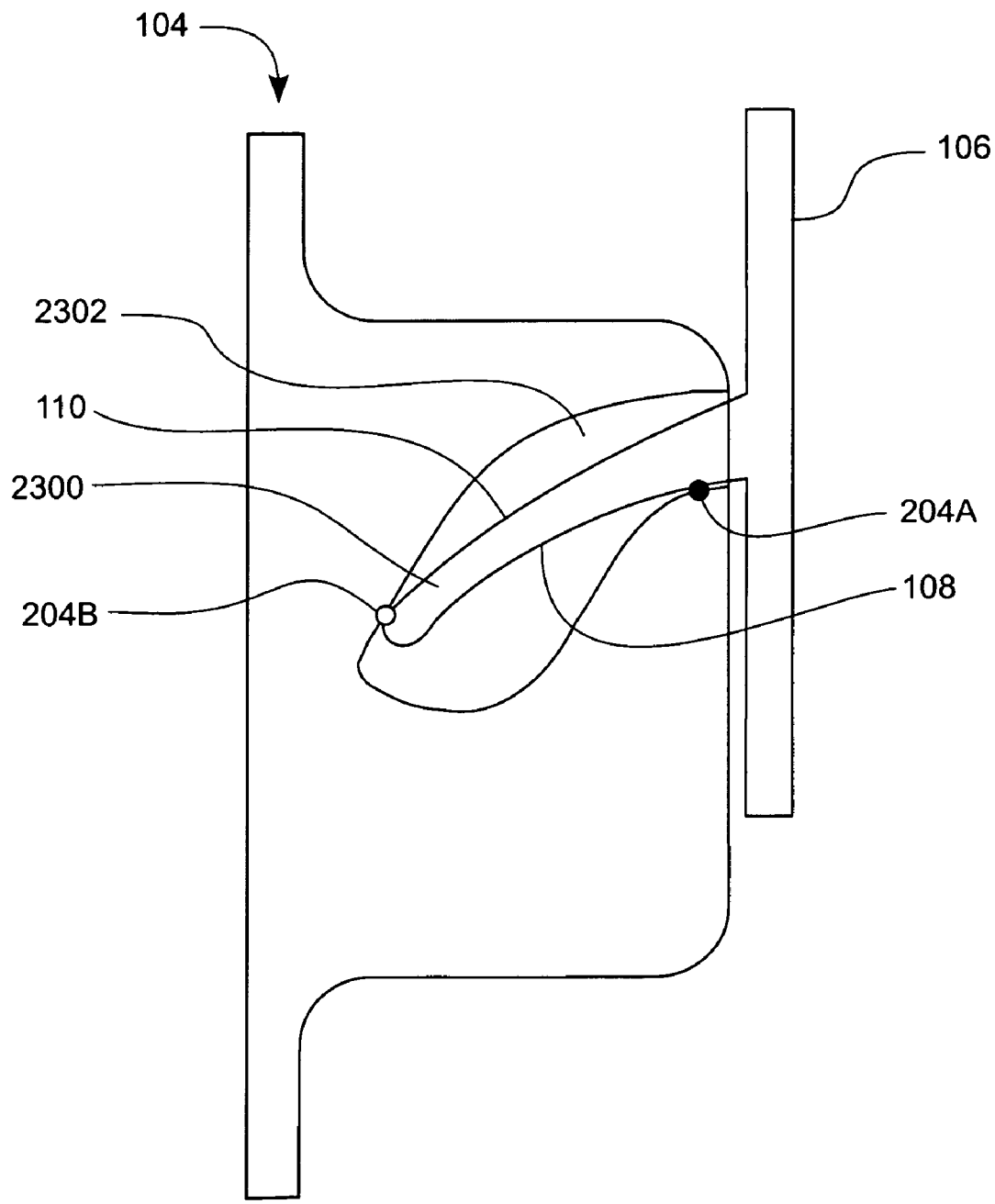
FIG. 24 shows a side plan view of a mounting system in accordance with an embodiment of the invention.

In some embodiments, the first and second surfaces, 108, 110, are carried by the display (e.g., by device panel 106), as shown in FIGS. 23 and 24. In FIG. 23, first surface 108 is carried by elongated member 2300 functionally coupled to device panel 106. Elongated member is disposed within a cavity 2302 defined by mount 104. First surface 108 engages with first engaging member 204A, which may be a roller as described above. In the embodiment of FIG. 23, second surface 110 engages with second engaging member 204B, which may also be a roller. In the embodiment of FIG. 24, the first and second surfaces 108, 110 and first and second engaging members 204A, B, are all disposed within cavity 2302.

As described above, the various mounting systems described herein may accommodate a large range of display weights. Generally, the ability of the mounting system 100 to immobilize a display is independent of the display weight. However, as the display weight increases, friction forces will also increase, thereby requiring more fore to move the display.

Further, the mounting systems may accommodate a range of display center of gravity locations. The accommodation may be provided by a variety of features. For example, the friction forces within the system help to accommodate a range of display center of gravity locations. These friction forces may be increased or decreased through methods such as providing lubricants or roughening the camming surfaces.

Figure 25:
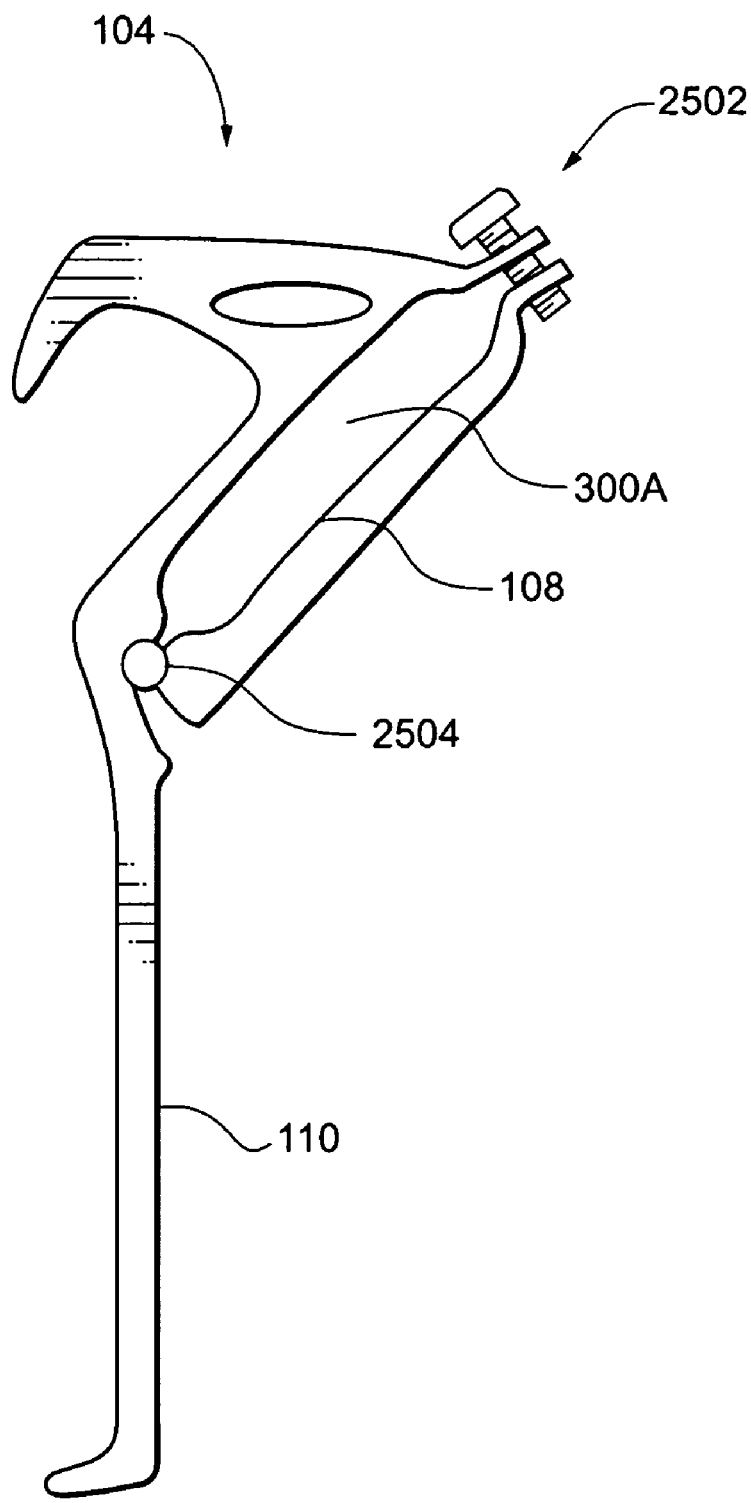
FIG. 25 shows a side plan view of a mount in accordance with an embodiment of the invention.

In some embodiments, the range of display center of gravity locations may be increased by providing an adjustable cam, as shown in FIG. 25. In FIG. 25, the contour and/or angle of first surface 108 may be adjusted by tightening adjustment screw 2502 to move the first surface 108 about pivot point 2504. In such a system, if a display having a center of gravity position to far from the mount 104 is desired to be continuously immobilized, adjustment screw 2502 may be tightened to provide a first surface better suited for that system. Such an adjustable system may be utilized to adjust the range of accommodation of display center of gravity positions as much as desired. For example, such a system may be utilized to accommodate a range of about 2 or more inches of initial display center of gravity locations. In some embodiments, such a system may accommodate a range of about 5 or more inches of initial display center of gravity locations.

The various embodiments of the slotted display mount and methods described above provide a number of advantages. For example, advantages include a mounting device having a two piece assembly to continuously immobilize a display screen and/or a device panel relative to a mounting panel. The two piece construction of the mounting device provides for a reliable system with fewer moving parts. Additionally, the mounting panel has a robust design that allows the use of plastics or the like to support a variety of heavy display screens. Stronger materials are used with the already robust mounting panel to support even heavier display screens. The mounting panel includes substantially continuous slots that facilitate continuous positioning of the device panel and/or the display screen along substantially any portion of the continuous slots. Recesses and notches that provide discrete positioning at various prescribed angles can be used, but are not needed for additional securing of the device panel. The geometry of the slots ensures the device panel and display screen are continuously immobilized in substantially any orientation relative to the mounting panel. The continuous slots of the mounting panel allow for positioning of the device panel and/or the display screen at a plurality of unprescribed angles. The reaction forces between engaging members in the continuous slots and the mounting panel counteract the weight of the display screen and/or the device panel to continuously immobilize the screen and/or the device panel at these unprescribed angles. Importantly, the slots and the cooperation of the device panel with the mounting panel allows a single mounting device to support and continuously position a variety of display screens with different weights and dimensions. With a single mounting device, no change in the design is needed for differing display screens, thereby providing a mounting device with a consistent cost.

Although selected advantages are detailed above, the list is not intended to be exhaustive. Although specific examples have been illustrated and described herein, it will be appreciated by those of ordinary skill in the art that any arrangement which is calculated to achieve the same purpose may be substituted for the specific embodiment shown. This application is intended to cover any adaptations or variations of the present invention. It is to be understood that the above description is intended to be illustrative, and not restrictive. Combinations of the above embodiments, and other embodiments will be apparent to those of skill in the art upon reviewing the above description. The scope of the invention includes any other applications in which the above structures and fabrication methods are used.

What is claimed is:

1. A mount for a display having a center of gravity, comprising:
    a first engaging member;
    a first surface having a geometry to engage the first engaging member;
    a second engaging member; and
    a second surface having a geometry to engage the second engaging member, the geometries of the first and second surfaces cooperating with the first and second engaging members to create reaction forces having directional components that cooperatively counteract the weight of the display such that the display can be continuously immobilized at any angle within a range of angles allowed by the mount to provide for tilt adjustment of the display, wherein tilt adjustment of the display causes a change to the position of the center of gravity of the display with respect to the mount.

2. The mount of claim 1, wherein at least one of the first and second surfaces are included in a slot.

3. The mount of claim 2, wherein the slot is substantially uninterrupted.

4. The mount of claim 1, wherein the display weighs less than about two-hundred pounds.

5. The mount of claim 1, wherein the display is positionable at least about five degrees backward and about twenty-five degrees forward relative to a vertical axis coincident with the mount.

6. The mount of claim 1, wherein the first and/or second surface is adapted to limit the travel of the first and/or second engaging members.

7. The mount of claim 1, wherein the mount is coupled to a support selected from the group consisting of a generally vertical surface, a wall mount, and a support arm.

8. The mount of claim 1, wherein the mount comprises a material selected from the group consisting of polymers, metals, composites, wood, and combinations thereof.

9. The mount of claim 1, further including a coating positioned to alter the friction between the first and/or second slots and the first and/or second engaging members.

10. The mount of claim 1, wherein the first surface is included within a first slot, and the second surface is included within a second slot.

11. The mount of claim 10, wherein the first slot is generally curved and the second slot is generally vertical and linear.

12. The mount of claim 10, wherein the first slot is generally curved and the second slot is generally linear and offset from a vertical position.

13. The mount of claim 10, wherein both the first and second slots are generally curved.

14. The mount of claim 10, wherein both the first and second slots are curved and are generally symmetrical about a horizontal axis.

15. The mount of claim 1, wherein the second surface is provided on a separate member.

16. The mount of claim 1, wherein the first surface is included within a slot and the second surface is not included within a slot.

17. The mount of claim 1, further including one or more retaining features to retain the mount on a support structure.

18. The mount of claim 1, wherein one or more of the engaging members comprise pins and rollers.

19. The mount of claim 1, wherein the mount is secured on a support by tightening a compression bolt.

20. The mount of claim 1, wherein the first and second surfaces are carried by the display.

21. The mount of claim 1, wherein the first surface is carried by an elongated member.

22. The mount of claim 21, wherein the elongated member is disposed within a cavity defined by the mount.

23. The mount of claim 21, wherein the first and second surfaces and first and second engaging members are disposed within the cavity.

24. The mount of claim 1, wherein the contour and/or angle of first surface may be adjusted by movement of an adjustment screw to move the first surface about a pivot point.

25. The mount of claim 1, wherein the first and second engaging members are functionally coupled to the display.

26. A mounting system comprising:

a mount including at least a first surface having a geometry and a second surface having a geometry, at least one of the first and second surfaces having an uninterrupted curved geometry;

a device panel including at least a first engaging member and a second engaging member, wherein the first and second engaging members are engagable with the geometries of the first and second surfaces respectively, to create reaction forces having directional components that cooperatively counteract the weight of a display coupled to the device panel such that the display can be continuously immobilized at any angle within a range of angled orientations relative to the mount, wherein tilt adjustment of the display causes a change to the position of a center of gravity of the display with respect to the mount.

27. A method comprising:

selectively positioning a device panel relative to a mount, wherein first and second engaging members are moveably coupled between the device panel and the mount, and the first and second engaging members are engaged with a first surface having a geometry and a second surface having a geometry, respectively, to create reaction forces having directional components that cooperatively counteract the weight of a display coupled to the device panel at any angle within a range of angles allowed by the mount; and continuously immobilizing the display at any angle relative to the mount within the range of angles allowed by the mount, wherein tilt adjustment of the display causes a change to the position of a center of gravity of the display with respect to the mount.

* * * * *